US011294492B2

(12) United States Patent  
Micci et al.

(10) Patent No.: US 11,294,492 B2  
(45) Date of Patent: Apr. 5, 2022

(54) PRESSURE SIGNAL PROCESSING

(71) Applicant: Cambridge Touch Technologies Ltd., Cambridge (GB)

(72) Inventors: Riccardo Micci, Cambridge (GB); Babak Bastani, Palo Alto, CA (US); Matteo Vit, Cambridge (GB); Arokia Nathan, Cambridge (GB); Paul Routley, Cambridge (GB); Michael Astley, Cambridge (GB)

(73) Assignee: Cambridge Touch Technologies Ltd., Cambridge (GB)

( * ) Notice: Subject to any disclaimer, the term of this patent is extended or adjusted under 35 U.S.C. 154(b) by 0 days.

(21) Appl. No.: 17/154,048

(22) Filed: Jan. 21, 2021

(65) Prior Publication Data

US 2021/0141507 A1    May 13, 2021

Related U.S. Application Data

(63) Continuation-in-part of application No. 16/431,488, filed on Jun. 4, 2019, now Pat. No. 10,928,947.

(30) Foreign Application Priority Data

Jun. 6, 2018    (GB) ...................................... 1809318  
Sep. 25, 2018   (GB) ...................................... 1815617

(51) Int. Cl.  
*G06F 3/041*        (2006.01)  
*G06F 3/044*        (2006.01)

(52) U.S. Cl.  
CPC ........ *G06F 3/04146* (2019.05); *G06F 3/0443* (2019.05); *G06F 3/0446* (2019.05)

(58) Field of Classification Search  
CPC ............. G06F 3/04182; G06F 3/04144; G06F 3/04146; G06F 3/044; G06F 2203/04106; G01L 1/16; G01L 1/146  
See application file for complete search history.

(56) References Cited

U.S. PATENT DOCUMENTS 9,690,408 B1   6/2017   Krah  
10,254,894 B2  4/2019   Nathan et al.  
(Continued)

FOREIGN PATENT DOCUMENTS

EP    2902886 A1    8/2015  
GB    2138567 A     10/1984  
(Continued)

OTHER PUBLICATIONS

International Search Report and Written Opinion, dated Jul. 23, 2019, directed to International application No. PCT/GB2019/051400, 13 pages.

(Continued)

*Primary Examiner* — Priyank J Shah

(57) ABSTRACT

A method includes receiving (S1), from a touch panel (1), force values (23) corresponding to a plurality of piezoelectric sensors (5, 6, 7), Each piezoelectric sensor corresponds to a physical location (xm, yn) on the touch panel. The method also includes receiving (S2) one or more user touch locations corresponding to user touches, The method also includes excluding (S5) all force values (23) corresponding to physical locations within a distance of a user touch location, and setting the remaining force values (23) as valid force values (S5). The method also includes interpolating and/or extrapolating (S6), based on the valid force values, one or more reconstructed force values (25) corresponding to same physical locations (xm, yn) as the respective excluded force values (23).

19 Claims, 13 Drawing Sheets

(56) References Cited

U.S. PATENT DOCUMENTS

| | | |
|---|---|---|
| 10,282,046 B2 | 5/2019 | Nathan et al. |
| 10,310,659 B2 | 6/2019 | Nathan et al. |
| 10,318,038 B2 | 6/2019 | Nathan et al. |
| 10,852,875 B2 | 12/2020 | Routley et al. |
| 10,928,947 B2 | 2/2021 | Micci et al. |
| 2010/0079384 A1 | 4/2010 | Grivna et al. |
| 2011/0175835 A1 | 7/2011 | Wang |
| 2012/0098783 A1 | 4/2012 | Badaye et al. |
| 2012/0120017 A1 | 5/2012 | Worfolk et al. |
| 2013/0033451 A1 | 2/2013 | Olsen |
| 2013/0076646 A1 | 3/2013 | Krah et al. |
| 2014/0043289 A1 | 2/2014 | Stern |
| 2014/0292699 A1 | 10/2014 | Ando |
| 2015/0077402 A1 | 3/2015 | Ye et al. |
| 2015/0091859 A1 | 4/2015 | Rosenberg et al. |
| 2015/0103042 A1 | 4/2015 | Lee et al. |
| 2015/0153900 A1 | 6/2015 | Chang et al. |
| 2016/0098131 A1 | 4/2016 | Ogata et al. |
| 2016/0179276 A1 | 6/2016 | Nathan et al. |
| 2016/0259465 A1 | 9/2016 | Agarwal et al. |
| 2016/0282999 A1 | 9/2016 | Hwang et al. |
| 2017/0199624 A1 | 7/2017 | Nathan et al. |
| 2017/0262099 A1 | 9/2017 | Nathan et al. |
| 2017/0322664 A1 | 11/2017 | Park et al. |
| 2018/0045586 A1 | 2/2018 | Kawamura |
| 2018/0074637 A1 | 3/2018 | Rosenberg et al. |
| 2018/0307365 A1 | 10/2018 | Chen et al. |
| 2019/0034021 A1 | 1/2019 | Zhao et al. |
| 2019/0050080 A1 | 8/2019 | Bagheri et al. |
| 2019/0377452 A1 | 12/2019 | Routley et al. |
| 2019/0377468 A1 | 12/2019 | Micci et al. |
| 2019/0377469 A1 | 12/2019 | Routley et al. |
| 2020/0159381 A1 | 5/2020 | Ban et al. |
| 2020/0356207 A1 | 11/2020 | Routley et al. |

FOREIGN PATENT DOCUMENTS

| | | |
|---|---|---|
| GB | 2544353 A1 | 5/2017 |
| GB | 2570538 A | 7/2019 |
| GB | 2574588 A | 12/2019 |
| JP | 2015097068 A | 5/2015 |
| WO | 2006135483 A2 | 12/2006 |
| WO | 2009150498 A2 | 12/2009 |
| WO | 2012031564 A1 | 3/2012 |
| WO | 2015046289 A1 | 4/2015 |
| WO | 2016102975 A2 | 6/2016 |
| WO | 2016199626 A1 | 12/2016 |
| WO | 2017109455 A1 | 6/2017 |
| WO | 2017122466 A1 | 7/2017 |

OTHER PUBLICATIONS

International Search Report and Written Opinion, dated Jul. 23, 2019, directed to International application No. PCT/GB2019/051567, 13 pages.

International Search Report and Written Opinion, dated Jul. 23, 2019, directed to International application No. PCT/GB2019/051568, 14 pages.

International Search Report and Written Opinion, dated Sep. 5, 2019, directed to International application No. PCT/GB2019/051605, 12 pages.

Combined Search and Examination Report under Sections 17 and 18(3) for UK application No. GB1809320.3 dated Dec. 21, 2018, 5 pages.

Extended European Search Report in EPO application EP 19177643.4 dated Oct. 30, 2019, 10 pages.

Routley et al., U.S. Appl. No. 15/734,600, Pressure Sensing Apparatus and Method, filed Dec. 3, 2020, 72 pages.

Astley et al., U.S. Appl. No. 15/734,653, Pressure Sensing Apparatus and Method, filed Dec. 3, 2020, 90 pages.

Combined Search and Examination Report under Sections 17 and 18(3) for UK application No. GB1809318.7 dated Dec. 21, 2018, 5 pages.

Combined Search and Examination Report under Sections 17 and 18(3) for UK application No. GB1815617.4 dated Mar. 14, 2019, 7 pages.

Extended European Search Report in EPO application EP 19177653.3, dated Oct. 30, 2019, 9 pages.

European Examination Report in EPO application EP 19177653.3, dated Dec. 23, 2021, 8 pages.

PRESSURE SIGNAL PROCESSING

CROSS-REFERENCE TO RELATED APPLICATIONS

This application is a continuation-in-part application of U.S. application Ser. No. 16/431,488, tiled Jun. 4, 2019 which further claims the benefit of priority from United Kingdom Patent Application No. GB1809318.7, filed on Jun. 6, 2018 and United Kingdom Patent Application No. GB1815617.4, filed on Sep. 25, 2018, each of which is hereby incorporated by reference in its entirety.

FIELD OF THE INVENTION

The present invention relates to processing signals from a touch panel for piezoelectric pressure sensing or combined capacitive and piezoelectric pressure sensing.

BACKGROUND

Resistive and capacitive touch panels are used as input devices for computers and mobile devices. One type of capacitive touch panel, projected capacitance touch panels, is often used for mobile devices because an exterior layer may be Made of glass, providing a hard surface which is resistant to scratching. An example of a projected capacitance touch panel is described in US 2010/0079384 A1.

Projected capacitance touch panels operate by detecting changes in electric fields caused by the proximity of a conductive object. The location at which a projected capacitance touch panel is touched is often determined using an array or grid of capacitive sensors. Although projected capacitance touch panels can usually differentiate between single-touch events and multi-touch events, they suffer the drawback of not being able to sense pressure. Thus, projected capacitance touch panels tend to be unable to distinguish between a relatively light tap and a relatively heavy press, A touch panel that can sense pressure can allow a user to interact with a device in new ways by providing additional information to simply position of a touch.

WO 2016/102975 A2 describes apparatus and methods for combined capacitance and pressure sensing in which a single signal is amplified then subsequently separated into pressure and capacitance components. WO 2017/109455 A1 describes apparatus and methods for combined capacitance and pressure sensing in which a single signal is separated into a capacitance signal, and a pressure signal which is amplified.

Piezoelectric sensors generate transient signals, and there have been attempts to develop methods for converting the transient piezoelectric signals into signals which are representative of static applied forces. For example, WO 2017/122466 A1, JP 2015/097068 A and EP 2 902 886 A1 describe methods for conditional integration of signals from piezoelectric sensors.

SUMMARY

According to a first aspect of the invention, there is provided a method including receiving, from a touch panel, force values corresponding to a plurality of piezoelectric sensors. Each piezoelectric sensor corresponds to a physical location on the touch panel. The method also includes receiving an identification of which, if any, of the force values are influenced by coupling to external electric fields. The method also includes, in response to one or more force values being identified as influenced by coupling to external electric fields, setting the corresponding force values as excluded force values, and setting the remaining force values as valid force values. The method also includes interpolating and/or extrapolating. based on the valid force values, one or more reconstructed force values corresponding to the same physical locations as the respective excluded force values.

The valid force values and the reconstructed force values may be output to a processor. The valid force values and the reconstructed force values may be used as input to a software application.

Interpolating and/or extrapolating one or more. reconstructed force values may include performing polynomial interpolation based on the valid force values and the respective physical locations.

Polynomial interpolation may be performed using a Lagrange polynomial method, a Newton polynomial method, or any other suitable polynomial interpolation method, for example a Neville polynomial method.

Interpolating and/or extrapolating one or more reconstructed force values may include determining a set of interpolation locations. The number of interpolation locations may be equal to the number of force values received. The interpolation locations may have a higher spatial density towards the edges of the touch panel than the physical locations. Interpolating and/or extrapolating one or more reconstructed force values may include determining an estimated force value for some or all of the interpolation locations by interpolating or extrapolating the valid force values from two or more physical locations proximate to or spanning the interpolation location. Interpolating and/or extrapolating one or more reconstructed force values may include performing polynomial interpolation using the estimated force values and the corresponding interpolation locations, and determining the one or more reconstructed force values using the polymer interpolant.

The interpolation locations may be selected to mitigate Runge's phenomenon. The interpolation locations may be determined as a number of Chebyshev points (also sometimes referred to as Chebyshev nodes) which is equal to the number of force values received.

Determining an estimated force value for some or all of the interpolation locations may include determining an estimated force value for every interpolation location.

Determining an estimated force value for some or all of the interpolation locations may include determining an estimated force value for each interpolation location which is spanned by a pair of adjacent physical locations which both correspond to valid force values, and determining an estimated force value for each interpolation location which is within a predetermined distance of a physical location corresponding to a valid force value.

Determining an estimated force value for some or all of the interpolation locations may include determining an estimated force value for each interpolation location which corresponds to a valid force value. An interpolation location corresponds to a force value if the position of the interpolation location within a sequence of all the interpolation locations ordered by coordinate matches the position of the physical location associated with the force value within a sequence of all the physical locations ordered by coordinate.

The method may also include receiving one or more touch locations which correspond to the coordinates at which a user interacts with the touch panel.

The method may also include, in response to a touch location is less than a predetermined distance from an edge of the touch panel, determining an estimated force value for every interpolation location. The method may also include, in response to a touch location is further then a predetermined distance from an edge of the touch panel, determining an estimated force value for each interpolation location which is spanned by a pair of adjacent physical locations which both correspond to valid force values, or determining an estimated force value for each interpolation location which corresponds to a valid force value.

Each estimated force value may be determined by: a) performing a linear interpolation based on a first physical location which corresponds to a valid force value, and a second physical location which is the closest physical location preceding the first physical location and corresponding to a valid force value; or b) performing a linear interpolation based on the first physical location and a third physical location which is the closest physical location following the first physical location and corresponding to a valid force value.

The first physical location may be the physical location of a valid force value which corresponds to, or is closest to, the interpolation location, The selection of steps a) or b) may be made in dependence upon comparing a cost function calculated for the first and second physical locations with a cost function calculated for the first and third locations, The term preceding may mean that the second location has a lower value than the first physical location with respect to a given coordinate system. The term following may mean that the third location has a greater value than the first physical location with respect to a given coordinate system.

The cost function may be selected from the group:

$$C_1 = \sqrt{(P_b - P_a)^2 + (x_b - x_a)^2} + C_{std}$$

$$C_2 = |x_b - x_{int}| \times \left(1 + \frac{|x_a - x_{int}|}{|x_b - x_a|}\right)$$

$$C_3 = |x_a - x_{int}| \times \left(\left|\frac{P_b - P_a}{x_b - x_a}\right| + |x_b - x_a|\right)$$

$$C_4 = |x_a - x_{int}| \times \left(\left|\frac{P_b - P_a}{x_b - x_a}\right| + |x_b - x_a| + \max\{|x_b - x_{int}|, 1\}\right)$$

$$C_5 = |P_b - P_a| \times |x_a - x_{int}|$$

$$C_6 = (|x_a - x_{int}| + |x_b - x_a|) \times \left|\frac{P_b - P_a}{x_b - x_a}\right| + C_{std}$$

$$C_7 = |x_a - x_{int}| \times C_{std} \times \left|\frac{P_b - P_a}{x_b - x_a}\right|$$

$$C_8 = |x_a - x_{int}| \times \left|\frac{P_b - P_a}{x_b - x_a}\right| + C_{std}$$

$$C_9 = |P_b - P_a|$$

$$C_{10} = |x_b - x_{int}| \times \max\left\{\frac{|x_a - x_{int}|}{|x_b - x_a|}, \frac{|x_b - x_{int}|}{|x_b - x_a|}, 1\right\}$$

In which $C_1$ to $C_{10}$ are first to tenth cost functions, $P_a$ is a first valid force value input corresponding to physical location $x_a$, $P_b$ is a second valid force value input corresponding to physical location $x_b$, $x_{int}$ is the interpolation location, and $C_{std}$ is a standard cost calculated according to:

$$C_{std} = \max\{|x_b - x_{int}|, 1\}$$

Each estimated force value may be determined based on calculating quadratic or cubic splines connecting two or more physical locations spanning the interpolation location. Each estimated force value may be determined based on calculating and extrapolating quadratic or cubic splines connecting two or more physical locations proximate to the interpolation location.

A first physical location may be a physical location of a valid force value which corresponds to, or is closest to, an interpolation location. Each estimated force value may be determined by: a) performing a linear interpolation based on a first pair of physical locations which are closest to the first physical location in any direction; or b) performing a linear interpolation based on a second pair of physical locations corresponding to the physical location which or to a valid pressure value immediately preceding the first physical location, and the physical location which corresponds to a valid pressure value immediately following the first physical location.

The selection of steps a) or b) may be made in dependence upon comparing a cost function calculated for the first pair of physical locations with a cost function calculated for the second pair of physical locations.

The first pair of physical locations may exclude the first physical location. The second pair of physical locations may exclude the first physical location, Any ambiguity in selecting the first and/or second pairs of physical locations may be resolved based on the interpolation location.

Interpolating and/or extrapolating one or more reconstructed force values may include fitting a force value model to the valid force values and the respective physical locations. The fitting may be a least squares fitting.

Interpolating and/or extrapolating one or more reconstructed force values may include determining a spline interpolant passing through each of the valid force values and the respective physical locations. The spline interpolant may be quadratic or cubic. The spline may use linear interpolation for locations proximate to an edge of the touch panel, and higher order interpolation elsewhere.

Receiving an identification of which, if any, of the force values are influenced by coupling to external electric fields may include determining which, if any, of the force values are influenced by coupling to external electric fields.

Determining which, if any, of the force values are influenced by coupling to external electric fields may include, for each force value, flagging the force value as influenced by coupling to external electric fields if the force value exceeds a pre-determined value threshold.

Determining which, if any, of the force values are influenced by coupling to external electric fields may include calculating a spatial gradient corresponding to each force value, based on the plurality of force values and the respective physical locations, and for each force value, in response to the corresponding spatial gradient exceeds a pre-determined spatial gradient threshold, flagging the force value as influenced by coupling to external electric fields.

Determining which, if any, of the force values are influenced by coupling to external electric fields may include calculating a temporal gradient corresponding to each force value, based on the currently measured force value and a buffer storing previously measured force values, and for each force value, in response to the corresponding temporal gradient exceeds a predetermined temporal gradient threshold, flagging the force value as influenced iv coupling to external electric fields.

The plurality of piezoelectric sensors may include a layer of piezoelectric material disposed between a plurality of sensing electrodes and at least one common electrode, Each piezoelectric sensor may be formed of a sensing electrode and a common electrode. The method may also include receiving an external interference signal which is a sum over signals received from all of the sensing electrodes and the, or each, common electrode. Determining which, if any, of the force values are influenced by coupling to external electric fields may include comparing the external interference signal against a pre-determined external interference threshold.

In response to the external interference signal exceeds the pre-determined external interference threshold, a global flag may be set to indicate that the force values are affected by coupling to external electric fields.

The method may include receiving one or more locations corresponding to user touches. The one or more locations may be determined using capacitive touch information. Determining which, if any, of the force values are influenced by coupling to external electric fields may include, in response to the global flag being set, excluding all force values corresponding to physical locations with a predetermined distance of a user touch location.

The value of one or more of the value threshold, the spatial gradient threshold and/or the temporal gradient threshold may be a first value in response to the global flag being set and second value in in response to the global flag being unset.

According to a second aspect of the invention, there is provided a computer program stored on a non-transitory computer readable medium and including instructions for causing a data processing apparatus to execute the method.

According to a third aspect of the invention, there is provided apparatus configured to carry out the method.

According to a fourth aspect of the invention, there is provided apparatus configured to receive force values corresponding to a plurality of piezoelectric sensors. Each piezoelectric sensor corresponds to a physical location on a touch panel, The apparatus is also configured to receive an identification of which, if any, of the force values are influenced by coupling to external electric fields. The apparatus is also configured, in response to one or more force values being identified as influenced by coupling to external electric fields, to set the corresponding force values as excluded force values, and to set the remaining force values as valid force values. The apparatus is also configured to interpolate and/or extrapolate, based on the valid force values, one or more reconstructed force values corresponding to the same physical locations as the respective excluded force values.

The apparatus may be configured to receive signals from the plurality of piezoelectric sensors. The apparatus may be further configured to generate the force values based on the received signals, each force value corresponding to one piezoelectric sensor or to two or more adjacent piezoelectric sensors.

A system may include the apparatus, and a touch panel comprising a plurality of piezoelectric sensors. The touch panel may also include a plurality of capacitance sensors. The touch panel may be a touch panel for combined piezoelectric pressure and capacitance measurements. The touch panel may include a layer of piezoelectric material disposed between a plurality of sensing electrodes and at least one common electrode. The apparatus may be further configured to generate capacitance values and force values based on signals received from the sensing electrodes.

According to a fifth aspect of the invention, there is provided a method including receiving, from a touch panel, force values corresponding to a plurality of piezoelectric sensors. Each piezoelectric sensor corresponds to a physical location on the touch panel. The method also includes receiving one or more user touch locations corresponding to user touches. The method also includes excluding all force values corresponding to physical locations within a distance of a user touch location, and setting the remaining force values as valid force values. The method also includes interpolating and/or extrapolating, based on the valid force values, one. or more reconstructed force values corresponding to the same physical locations as the respective excluded force values.

The method according to the fifth aspect may include features corresponding to any features of the first second, third and/or fourth aspects of the invention.

Receiving the one or more user touch locations may include receiving, from the touch panel, capacitive touch information, and determining the one or more locations corresponding to user touches based on the capacitive touch information.

Receiving the one or more user touch locations may include determining the one or more locations corresponding to user touches based on pressure signals received from the plurality of piezoelectric sensors.

The plurality of piezoelectric sensors may include a layer of piezoelectric material disposed between a plurality of sensing electrodes and at least one common electrode. Each piezoelectric sensor may be formed of a sensing electrode and a common electrode. The method may also include receiving an external interference signal which is a sum over signals received from all of the sensing electrodes and the, or each, common electrode. The method may also include, in response to the external interference signal exceeds a pre-determined external interference threshold, setting a global flag, The method may also include, in response to the global flag being set, excluding all force values corresponding to physical locations with a predetermined distance of a user touch location.

The distance may be a predetermined distance. The distance may be a dynamically determined distance.

According to a sixth aspect of the invention there is provided apparatus configured to receive force values corresponding to a plurality of piezoelectric sensors. Each piezoelectric sensor corresponds to a physical location on a touch panel. The apparatus is also configured to receive one or more user touch locations corresponding to user touches. The apparatus is also configured to exclude all force values corresponding to physical locations within a distance of a user touch location, and to set the remaining force values as valid force values. The apparatus is also configured to interpolate and/or extrapolate, based on the valid force values, one or more reconstructed force values corresponding to the same physical locations as the respective excluded force values.

The method according to the sixth aspect may include features corresponding to any features of the first, second, third, fourth and/or fifth aspects of the invention.

Receiving the one or more user touch locations may include receiving, from the touch panel, capacitive touch information, and determining the one or more locations corresponding to user touches based on the capacitive touch information.

Receiving the one or more user touch locations may include determining the one or more locations corresponding to user touches based on pressure signals received from the plurality of piezoelectric sensors.

The plurality of piezoelectric sensors may include a layer of piezoelectric material disposed between a plurality of sensing electrodes and at least one common electrode. Each piezoelectric sensor may be formed of a sensing electrode and a common electrode. The apparatus may also be configured to receive an external interference signal which is a sum over signals received from all of the sensing electrodes and the, or each, common electrode. The apparatus may also be configured, in response to the external interference signal exceeds a pre-determined external interference threshold, to set a global flag. The apparatus may also be configured, in response to the global flag being set, to exclude all force values corresponding to physical locations with a predetermined distance of a user touch location. The distance may be a predetermined distance. The distance may be a dynamically determined distance.

A system may include the apparatus according to the sixth aspect, and a touch panel comprising a plurality of piezoelectric. sensors. The touch panel may also include a plurality of capacitance sensors. The touch panel may be a touch panel for combined piezoelectric pressure and capacitance measurements. The touch panel may include a layer of piezoelectric material disposed between a plurality of sensing electrodes and at least one common electrode. The apparatus may be further configured to generate capacitance values and force values based on signals received from the sensing electrodes.

BRIEF DESCRIPTION OF THE DRAWINGS

Certain embodiments of the present invention will now be described, by way of example, with reference to the accompanying drawings in which.

DETAILED DESCRIPTION

Figure 1:
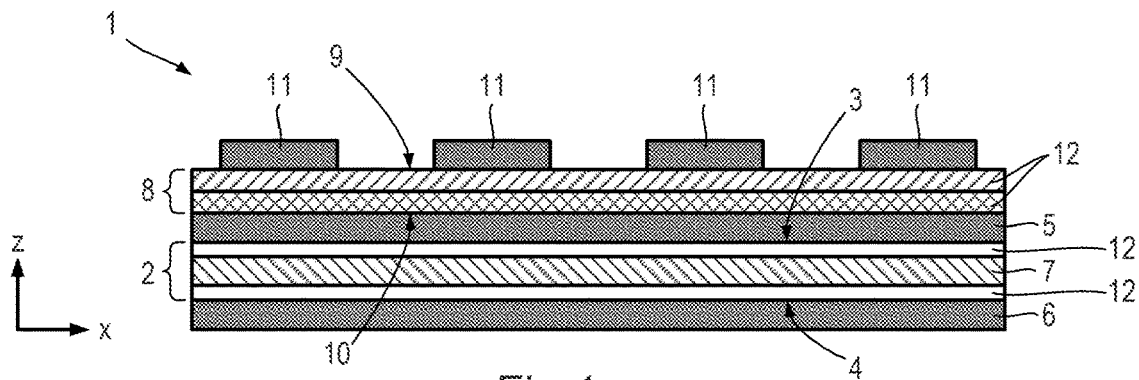
FIG. 1 is a cross-section of a touch panel for piezoelectric pressure measurements or combined capacitive and piezoelectric pressure measurements.

In the following description, like parts are denoted by like reference numerals.

In some circumstances, a variety of unwanted signals may couple via a user's digit or conductive stylus to the sensing electrodes of a piezoelectric pressure sensing touch panel or a combined capacitance and piezoelectric pressure sensing touch panel. Such signals may be amplified along with the desired piezoelectric pressure signals, and may be of comparable or larger amplitude than the desired piezoelectric pressure signals. For example a user's digit placed on a piezoelectric pressure sensing touch panel or a combined capacitance and piezoelectric pressure sensing touch panel sensor may couple mains interference into the sensing electrodes, Additionally or alternatively, a user may become charged with static electricity, which may couple to the sensing electrodes of a piezoelectric pressure sensing touch panel or a combined capacitance and piezoelectric pressure sensing touch panel. The present specification is concerned with signal post-processing methods intended to reduce or remove the effects of such unwanted signals, in order to allow more accurate measurements of a force or forces applied to a piezoelectric pressure sensing touch panel or a combined capacitance and piezoelectric pressure sensing touch panel by one or more user interactions.

Herein, the term "user interaction" may refer to a user touching or pressing a touch panel 1 (FIG. 1) or a layer of material overlying a touch panel. A user interaction may involve a user's digit or a stylus (whether conductive or not). A touch interaction may include a user's digit or conductive stylus being proximate to the touch panel 1 (FIG. 1) without direct physical contact or without applying significant force. A press interaction involves a user pressing the touch panel 1 (FIG. 1) with sufficient force to cause straining of a layer of piezoelectric material and generation of a piezoelectric response. The location of a user interaction may change with time as a user moves a digit or stylus. The methods of the present specification may be applied to the measurement and tracking of one or more concurrent user interactions, sometimes referred to as "multi-touch" interactions.

Referring to FIG. 1, an example of a touch panel 1 for piezoelectric pressure measurements or combined capacitive and piezoelectric pressure measurements is shown.

The touch panel 1 includes a first layer structure 2 having a first face 3 and a second, opposite, face 4. A number of first sensing electrodes 5 are disposed on the first face 3 of the first layer structure 2. Each of the first sensing electrodes 5 extends (or equivalently is elongated) in a first direction x, and the first sensing electrodes 5 are spaced apart in a second direction y. A common electrode 6 is disposed to substantially cover the second face 4 of the first layer structure 2.

The first layer structure 2 includes one or more layers, including at least a layer of piezoelectric material 7. Each layer included in the first layer structure 2 is generally planar and extends in first, x, and second, y, directions which are perpendicular to a thickness direction z, The one or more layers of the first layer structure 2 are arranged between the first and second faces 3, 4 such that the thickness direction z of each layer of the first layer structure 2 is substantially perpendicular to the first and second faces 3, 4.

The touch panel 1 also includes a second layer structure 8 having a first face 9 and a second, opposite, face 10. A number of second sensing electrodes 11 are disposed on the first face 9 of the second layer structure 8. Each of the second sensing electrodes 11 extends (or equivalently is elongated) in the second direction y, and the second sensing electrodes it are spaced apart in the first direction x.

The second layer structure S includes one or more dielectric layers 12. Each dielectric layer 12 is generally planar and extends in first, x, and second, y, directions which are perpendicular to a thickness direction z. The one or more dielectric layers 12 of the second layer structure 8 are arranged between the first and second faces 9, 10 of the second layer structure 8 such that the thickness direction z of each dielectric layer 12 of the second layer structure 8 is perpendicular to the first and second faces 9, 10.

Preferably, the layer of piezoelectric material 7 includes or is formed of a piezoelectric polymer such as polyvinylidene fluoride (PVDF) or polylactic acid. However, the layer of piezoelectric material may alternatively be a layer of a piezoelectric ceramic such as lead zirconate titanate (PZT). Preferably, the first and second sensing electrodes 5, 11, and the common electrode 6 are formed from silver nanowires. However, the first and second sensing electrodes 5, 11, and the common electrode 6 may alternatively be formed of transparent conductive oxides such as indium tin oxide (ITO) or indium zinc oxide (IZO), The first and second sensing electrodes 5, 11, and the common electrode 6 may be metal films such as aluminium, copper, silver or other metals suitable for deposition and patterning as a thin film. The first and second sensing electrodes 5, 11, and the common electrode 6 may be conductive polymers such as polyaniline, polythiphene, polypyrrole or poly(3,4-ethylenedioxythiophene) polystyrene sulfonate (PEDOT/PSS). The first and second sensing electrodes 5, 11, and the common electrode 6 may be formed from a metal mesh, metallic nanowires, graphene, and/or carbon nanotubes. The dielectric layer(s) 12 may include layers of a polymer dielectric material such as polyethylene terephthalate (PET) and/or layers of pressure sensitive adhesive (PSA) materials, However, the dielectric layer(s) 12 may include layers of a ceramic insulating material such as aluminium oxide.

The first layer structure 2 may include only the layer of piezoelectric material 7 such that the first and second opposite faces 3, 4 are faces of the layer of piezoelectric material 7. Alternatively, the first layer structure 2 may include one or more dielectric layers 12 which are stacked between the layer of piezoelectric material 7 and the first face 3 of the first layer structure 2. The first layer structure 2 may additionally or alternatively include one or more dielectric layers 12 stacked between the second face 4 of the first layer structure 2 and the layer of piezoelectric material 7.

The second layer structure 8 may include only a single dielectric layer 12, such that the first and second faces 9, 10 of the second layer structure 8 are faces of a single dielectric layer 12. Alternatively, a second layer structure 8 need not be used, and the second sensing electrodes 11 may be disposed on the first face 3 along with the first sensing electrodes 5.

in FIG. 1, the touch panel a has been shown with reference to orthogonal axes labelled x, y, and z. However, the first, second and thickness directions need not form a right handed orthogonal set. In other examples, the first sensing electrodes 5 may be elongated in the second, y, direction and the second sensing electrodes 11 may be elongated in the first, x, direction.

Figure 2:
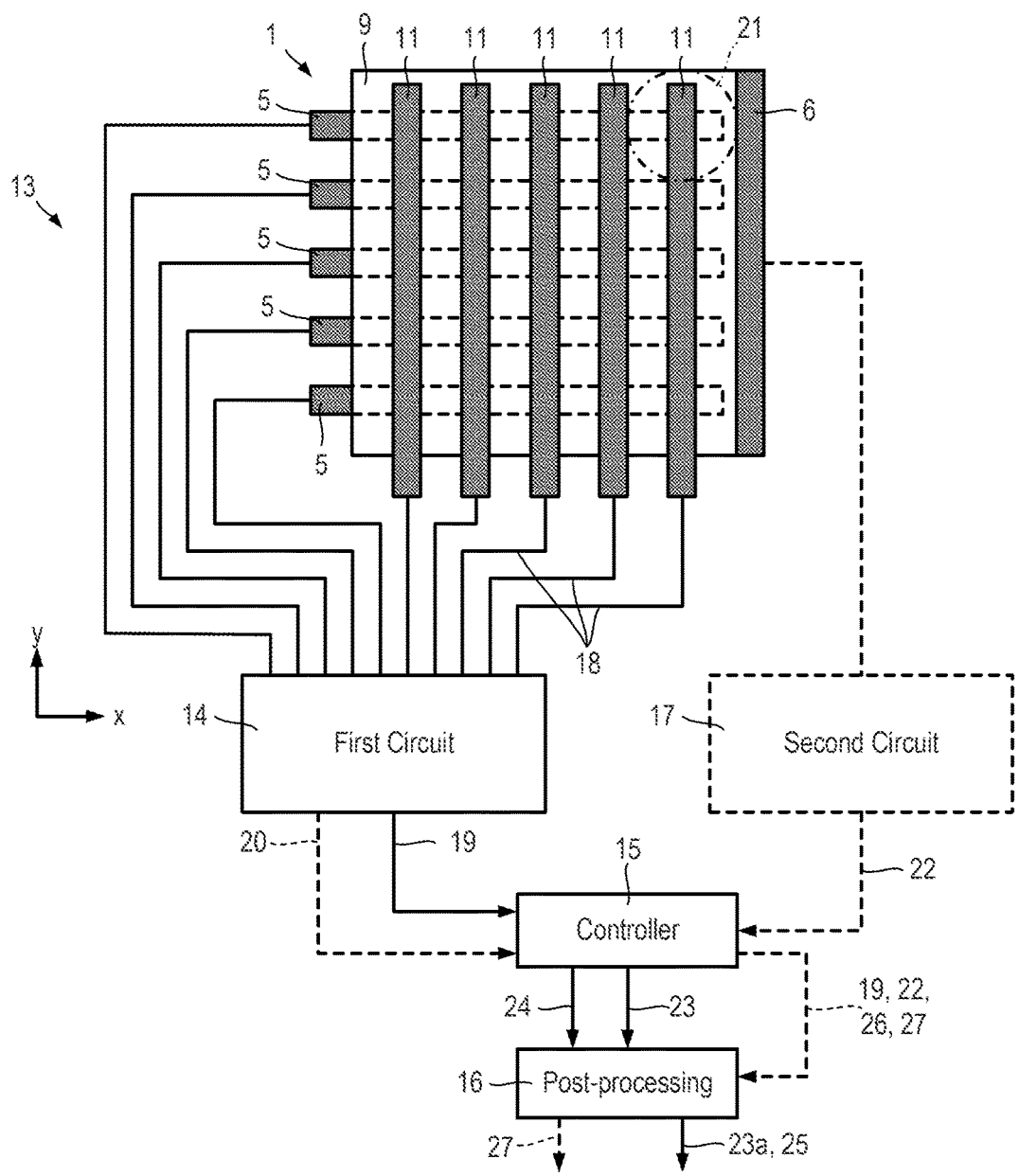
FIG. 2 schematically illustrates an apparatus for piezoelectric pressure measurements or combined capacitance and piezoelectric pressure measurements.

Referring also to FIG. 2, an example of apparatus 13 for piezoelectric pressure measurements or combined capacitance and piezoelectric pressure measurements is shown.

The apparatus 13 includes the touch panel 13 a first circuit 14, a controller 15, a post-processing module 16, and optionally a second circuit 17. Each of the first and second sensing electrodes 5, 11 is connected to the first circuit 14 by a corresponding conductive trace 18. When present, the second circuit 17 is connected to the common electrode 6.

In some examples, the first circuit 14, controller 15, post-processing module 16 and, optionally, the second circuit 17, may each be provided as separate components. However, in other examples, the first circuit 14, controller 15, post-processing module 16 and, optionally, the second circuit 17, may all be provided by a single component. For example a single microcontroller, application specific integrated circuit, processor, and so forth. In still further examples, the functions of the first circuit 14, controller 15, post-processing module 16 and, optionally, the second circuit 17, may be divided between a touch controller (not shown) and a central processor or processors (not shown) of a device (not shown) incorporating the apparatus 13.

The first circuit 14 receives from and/or transmits signals to the first and second sensing electrodes 5, 11. The first circuit 14 measures first piezoelectric pressure signals 19. The first circuit 14 is connectable to each of the first and second sensing electrodes 5, 11, in groups or individually. Each first piezoelectric pressure signal 19 corresponds to one or more of the first or second sensing electrodes 5, 11, and each first piezoelectric pressure signal 19 is indicative of a pressure acting on the touch panel 1 proximate to the respective first or second sensing electrodes 5, 11. For example, the first circuit 14 may measure or generate a first piezoelectric pressure signal 19 corresponding to each first sensing electrode 5 and a first piezoelectric pressure signal 19 corresponding to each second sensing electrode 11. Alternatively, each first piezoelectric pressure signal 19 may correspond to a pair of adjacent first or second sensing electrodes 5, 11, and so forth. Each sensing electrode 5, 11 contributes to one of the first piezoelectric pressure signals 19.

Optionally, the first circuit 14 may also measure mutual capacitance signals 20 corresponding to each intersection 21 of the first and second sensing electrodes 5, 11. In other examples, the first circuit 14 may instead measure self-capacitance signals corresponding to each first and/or second sensing electrode 5, 11. The first circuit 14 may determine the capacitance signals 20 and the first piezoelectric pressure signals 19 concurrently. Alternatively, the first circuit 14 may alternate between determining the capacitance signals 20 and the first piezoelectric pressure signals 19.

For example, the first circuit 14 may be configured for combined capacitance and piezoelectric pressure measurements as described in WO 2016/102975 A2, the entire contents of which are incorporated herein by reference. In particular, the first circuit 14 may be configured as described in relation to examples shown FIGS. 21 to 26 of WO 2016/102975 A2. Alternatively, the first circuit 14 may be configured for combined capacitance and piezoelectric pressure measurements as described in WO 2017/109455 the entire contents of which are incorporated herein by reference. In particular, the first circuit 14 may be configured as described in relation to examples shown in FIGS. 4 to 21 of WO 2017/109455 A1.

However, the methods of the present specification are not limited to these examples, and are applicable to any first circuit 14 which is capable of providing the hereinbefore described functions.

When present, the optional second circuit 17 measures a second piezoelectric pressure signal 22 which corresponds to the common electrode 6. The second piezoelectric signal 22 should be indicative of a total pressure applied to the touch panel 1. When more than one common electrode 6 is used, a second piezoelectric signal 22 may be generated corresponding to each common electrode 6, for subsequent summation by the controller 15. Alternatively, when more than one common electrode 6 is used, the second circuit 17 may generate a single second piezoelectric signal 17 based on charges induced on all of the common electrodes 6. Under ideal conditions and in the absence of external interference, a sum over the second piezoelectric pressure signal(s) 22 and the first piezoelectric signals 19 should be approximately zero (up to a measurement error) because the sensing electrodes 5, 11 and the common electrode(s) 6 are arranged on opposite sides of any polarisation P induced within the layer of piezoelectric material 7.

The first piezoelectric pressure signal 19, and optionally the second piezoelectric pressure signal(s) 22 and/or the capacitance signals 20, are produced in response to a user interaction with the touch panel 1, or with a layer of material overlying the touch panel 1.

The controller 15 receives the first piezoelectric pressure signals 19 and integrates them to generate corresponding force values 23. In effect, each pairing of one sensing electrode 5, 11 with the underlying common electrode 6 constitutes a separate piezoelectric sensor. An example of integrating the first piezoelectric pressure signals 19 to generate force values 23 shall be explained hereinafter with reference to FIGS. 3 to 6. The controller 15 also generates an identification 24 of which, if any, of the force values 23 are influenced by coupling to external electric fields. If any of the force values 23 are influenced by coupling to external electric fields, then the methods of the present specification may be applied to reduce or remove the effects, so as to obtain a better estimate of one or more forces applied by a user interaction. Examples of methods for determining which, if any, of the force values 23 are influenced by coupling to external electric fields are described hereinafter.

The post-processing module 16 receives the force values 23, each of which corresponds to one of the piezoelectric sensors provided by a pair of one or more sensing electrodes 5, 11 and the common electrode 6. In this way, each force value corresponds to a physical location on the touch panel 1. The post-processing module 16 also receives the identification 24 of which, if any, of the force values 23 are influenced by coupling to external electric fields. The post-processing module is configured, in response to one or more force values 23 being identified as influenced by coupling to external electric fields, to set the corresponding force values 23 as excluded force values 23b (FIG. 8), and to set the remaining force values 23 as valid force values 23a. The post-processing module 16 determines one or more reconstructed force values 25 corresponding to the same physical locations as the respective excluded force values 23b (FIG. 8), based on interpolating and/or extrapolating the valid force values 23a and corresponding physical locations. The valid force values 23a and the reconstructed force values 25 may be output to one or more. processors (not shown) of a device (not shown) incorporating the apparatus 13. The valid force values 23a and the reconstructed force values 25 may be used as input to a software application (not shown) being executed by a device incorporating the apparatus 13.

In some examples, when the apparatus 13 includes the second circuit 16, the controller 15 may also receive the second piezoelectric pressure signal 22, and may sum the second piezoelectric pressure signal 22 with all of the first piezoelectric pressure signals 19 to generate an external interference index 26. The external interference index 26 may be a simple sum over the unweighted first and second piezoelectric pressure signals 19, 22, or, the external interference index 26 may be a weighted sum over the first and second piezoelectric pressure signals 19, 22. The controller 15 may be configured to generate the indication 24 at least in part based on a comparison of the external interference index 26 against a pre-calibrated threshold (for example Vthresh). Optionally, the external interference index 26 may also be output to the post-processing module 16 to provide an indication of the magnitude of external interference.

Optionally, the controller 15 may also relay the raw first and/or second piezoelectric pressure signals 19, 22 to the post-processing module 16 and/or to the one or more processors (not shown) which operate a device incorporating the apparatus 13.

In some examples, the controller 15 may also determine touch location data 27 based on the first pressure signals 19, and optionally the second pressure signals 22. The touch location data 27 indicates the location, for example x, y coordinates, of one or more user interactions. When determined, the touch location data 27 may be output to the post-processing module 16 and/or to the one or more processors (not shown) which operate a device incorporating the apparatus 13. In other examples, the touch location data 27 may be determined by the post-processing module 16.

When measured, the controller 15 receives the capacitance signals 20 and either relays them to the one or more processors (not shown) which operate the device incorporating the apparatus 13, or performs further processing of the capacitance values 20. For example, the controller 15 may process the capacitance signals 20 to generate or contribute to generating the touch location data 27. Capacitance signals 20 may permit more accurate determination of the touch location data 27 than the first signals 19 alone. Capacitance signals 20 may also be used in the process of generating the force values 23.

Functions of the controller 15 and post-processer 16 may be distributed between these two elements in any manner which is compatible with the necessary ordering of the processing steps. The controller 15 and post-processing module 16 may be combined as a single element. All of the functions of the controller 15 and post-processing module 16 may be provided by one or more processors (not shown) of a device (not shown) incorporating the apparatus 13.

Before describing the methods for reducing or removing the influence of coupling to external electric fields, it may be helpful to briefly describe an example of integrating the piezoelectric pressure signals 19, 22 to produce corresponding force values 23.

Figure 3:
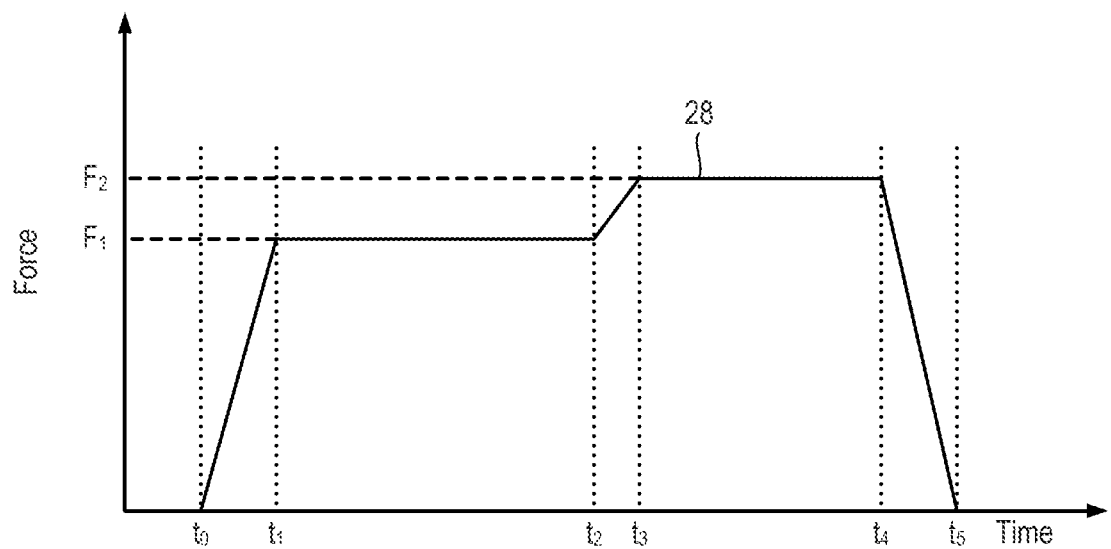
FIG. 3 illustrates a force input applied to a touch panel.

Referring also to FIG. 3 an applied force input 28 to a touch panel 1 is schematically illustrated.

Figure 4:
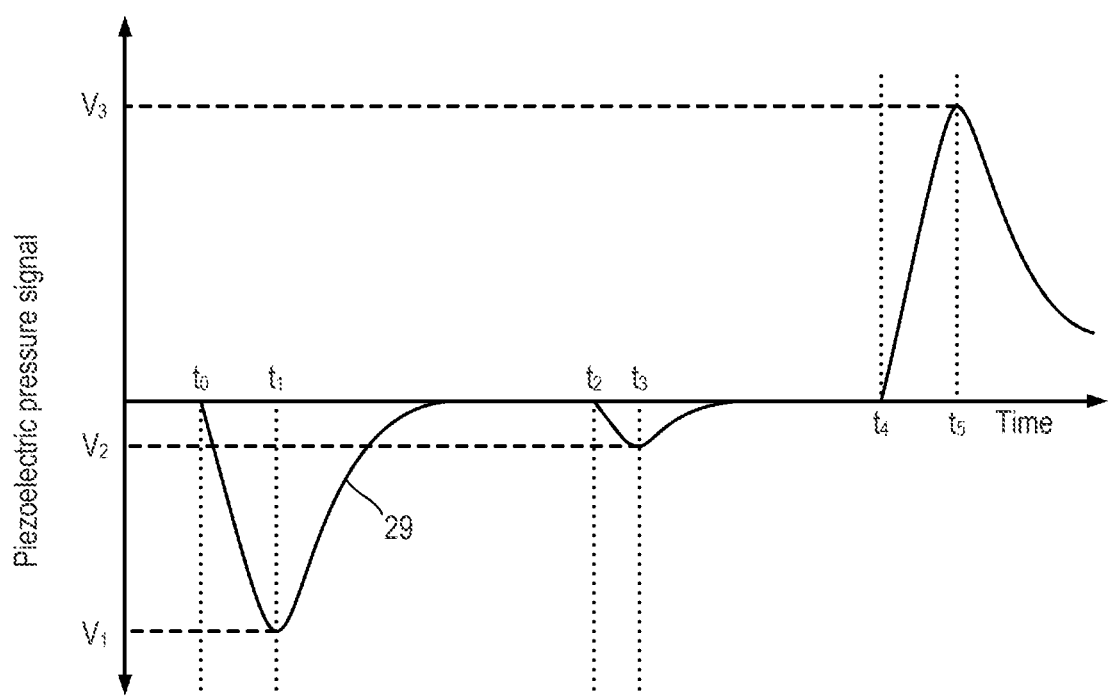
FIG. 4 illustrates a piezoelectric pressure signal corresponding to the force input illustrated in FIG. 3.

Referring also to FIG. 4, an idealised piezoelectric pressure signal 29 corresponding to the force input 28 is shown.

The layer of piezoelectric material 7 is poled and becomes polarised with a polarisation P in response to straining caused by a user interaction which applies sufficient force. The polarisation P of the layer of piezoelectric material 7 results in a corresponding charge $Q_{piezo}(t)$ being developed between the common electrode 6 and the sensing electrodes 5, 11. The straining which produces the polarisation P may result from a compression or a tension. The straining which produces the polarisation P may be an in-plane stretching of the piezoelectric material layer 7. Intimate contact between the layer of piezoelectric material 7 and the sensing electrodes 5, 11 is not required. Generally, a greater straining of the layer of piezoelectric material 7 (caused b a more forceful user interaction) will result in a greater polarisation P, and a correspondingly larger magnitude of the charge difference $\Delta Q_{piezo}$ induced on the sensing electrodes 5, 11. A piezoelectric response $I_{piezo}(t)$, which is the current associated with the charge $Q_{piezo}(t)$, may be amplified and/or integrated to determine the first and second piezoelectric pressure signals 19, 22. The idealised piezoelectric pressure signal 29 may correspond to a first or second piezoelectric pressure signal 19, 22, The piezoelectric pressure signals 19, 22, 29, for example as output from the first or second circuits 14, 17, are fundamentally transient signals. The induced piezoelectric voltages decay with time due to leakage currents. Moreover, the output of an integrating charge amplifier, which may be included in the first or second circuits 14 to amplify a piezoelectric current $I_{piezo}$, also decays with time.

For example, during a first loading period, $t_o \leq t \leq t_1$, the force 28 increases steadily from zero to a first applied force value $F_1$. Provided that the rate of increase of the applied input force 28 is fast compared to the rate of decay of the corresponding piezoelectric pressure signal 29, the piezoelectric pressure signal 29 decreases steadily during the first loading period $t_o \leq t \leq t_1$, reaching a first peak value of V, as the force 28 reaches the first applied force value $F_1$. The applied input force 28 is then held constant at $F_1$ for a first holding period, $t_1 < t \leq t_2$. During the first holding period, $t_1 < t \leq t_2$, the piezoelectric pressure signal 29 decays upwards from the first peak value $V_1$ towards, in the ideal case, zero DC offset.

The applied input force 28 increases again from the first applied force value $F_1$ to a second applied force value $F_2$ during a second loading period $t_2 < t \leq t_3$. Provided that the rate of increase of the applied input force 28 is fast compared to the rate of decay of the corresponding piezoelectric pressure signal 29, the piezoelectric pressure signal 29 decreases steadily during the second loading period $t_2 < t \leq t_3$, reaching a second peak value of $V_2$ as the force 28 reaches the second applied force value $F_2$. The applied input force 28 is then held constant at $F_2$ for a second holding period, $t_3 < t \leq t_4$. During the second holding period, $t_3 < t \leq t_4$, the piezoelectric pressure signal 29 decays upwards from the second peak value $V_2$ towards, in the ideal case, zero signal.

At the end of the second holding period, $t_3 < t \leq t_4$, the user interactions ends with the release of the applied input force 28 during an unloading period $t_4 < t \leq t_3$. Provided that the rate of decrease of the applied input force 28 is fast compared to the rate of decay of the corresponding piezoelectric pressure signal 29, the piezoelectric pressure signal 29 increases steadily during the unloading period $t_4 < t \leq t_5$, reaching a third peak value $V_3$, as the force 28 reaches zero. The third peak value $V_3$, resulting from unloading rather than loading, has opposite sign to the first and second peak values $V_1$, $V_2$. After the end of the user interaction, the piezoelectric pressure signal 29 decays towards, in the ideal case, zero DC offset. Although FIG. 4 illustrates the idealised piezoelectric pressure signal 29 becoming negative in response to loading and positive in response to unloading, the polarity of the piezoelectric pressure signal 29 may be reversed in other examples, depending on the configuration of the touch panel 1 and apparatus 13.

When the piezoelectric pressure signal 29 is ideal, or approximately ideal, as illustrated in FIG. 4, the decay of the piezoelectric pressure signal 29 may be compensated for by various methods such as, for example, conditional integration of the piezoelectric pressure signal 29 based on the gradient and/or values of the piezoelectric pressure signal 29. By integrating the piezoelectric pressure signal 29 when the gradient and value of the piezoelectric pressure signal 29 are the same sign, an estimated measurement proportional to the applied force 28 may be recovered.

However, when a touch panel 1 and apparatus 13 for combined pressure and capacitance measurements is used, piezoelectric pressure signals 19, 22, 29 may in practice be subjected to continuous variations in DC offsets and significant sources of noise which may prevent the reliable operation of naive value and gradient based conditional integrations. Although not directly linked to the methods of the present specification, which may be applied to measured force values 23 howsoever obtained, potential sources of noise, external electric field coupling and an example method of integrating the piezoelectric pressure signals 9, 22, 29 to obtain force values 23 shall be briefly discussed as context for the methods of the present specification.

The touch panel 1 and apparatus 13 may often he installed in a handheld, battery operated electronic device (not shown). Such devices are typically ungrounded, or only weakly grounded, which may increase the susceptibility to noise pickup and to variations in DC offsets. Additionally, a user may frequently become charged with static electricity as a result of interactions between their clothing, footwear and/or their environment. This may further contribute to variations in DC offsets, and may also result in electrostatic coupling between the user's digit and/or stylus upon an initial contact with the touch panel 1. Such electrostatic coupling, can induce charges to the sensing electrodes 5, 11 close to a user interaction which may equal, or even substantially exceed, charges $Q_{piezo}$ resulting from applied forces. Furthermore, short interactions such as tapping a touch panel 1 in rapid succession may confuse gradient and value based approaches because the signal from one tap may not have completely decayed before the next tap commences, leading to inaccurate measurements of forces. The preceding discussion is not exhaustive, and many additional factors may contribute to DC offset variations and noise levels of a touch panel 1 and apparatus 13. One method of obtaining force values 23 from the received piezoelectric pressure signals 19, 22, 29 shall be briefly summarised.

Figure 5:
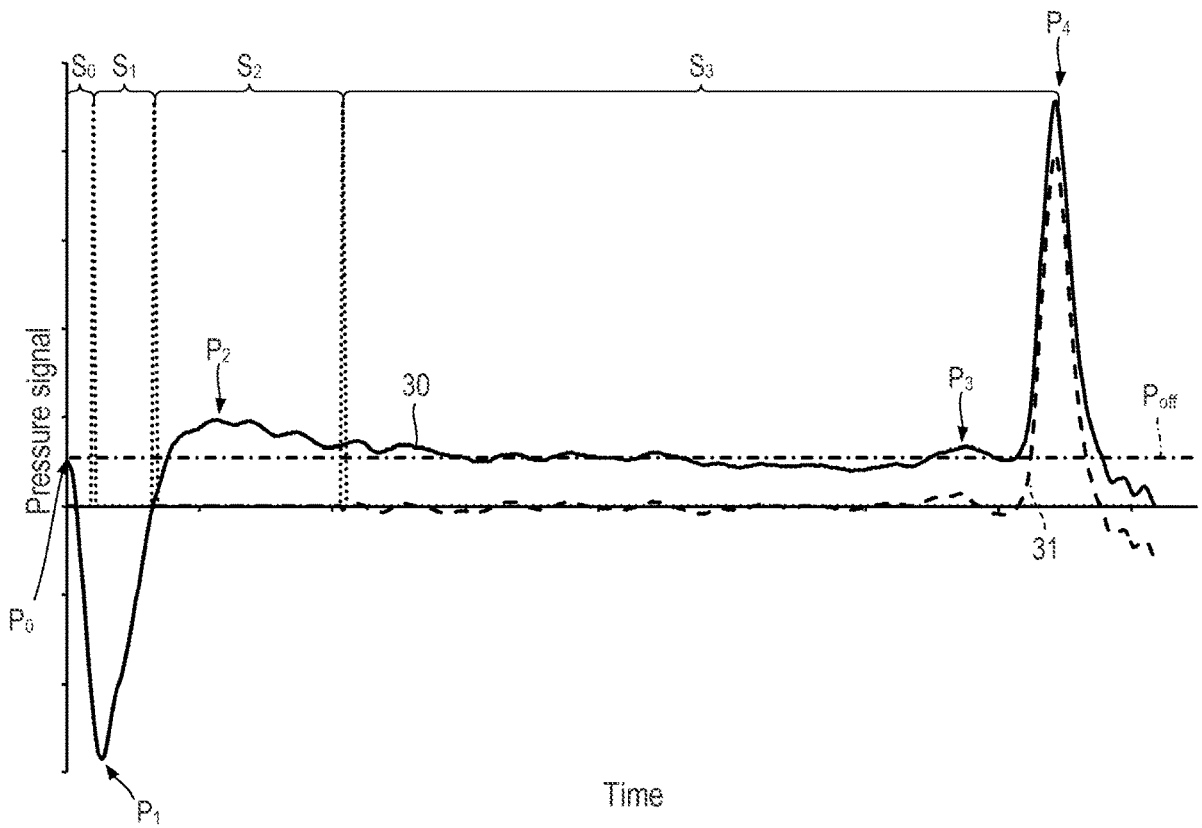
FIG. 5 plots an example of a measured piezoelectric pressure signal.

Referring also to FIG. 5, an example of a measured piezoelectric pressure signal 30 obtained using an example of the touch panel 1 and apparatus 13 is shown. The measured piezoelectric pressure signal 30 may represent a first or second piezoelectric pressure signal 19, 22.

Figure 6:
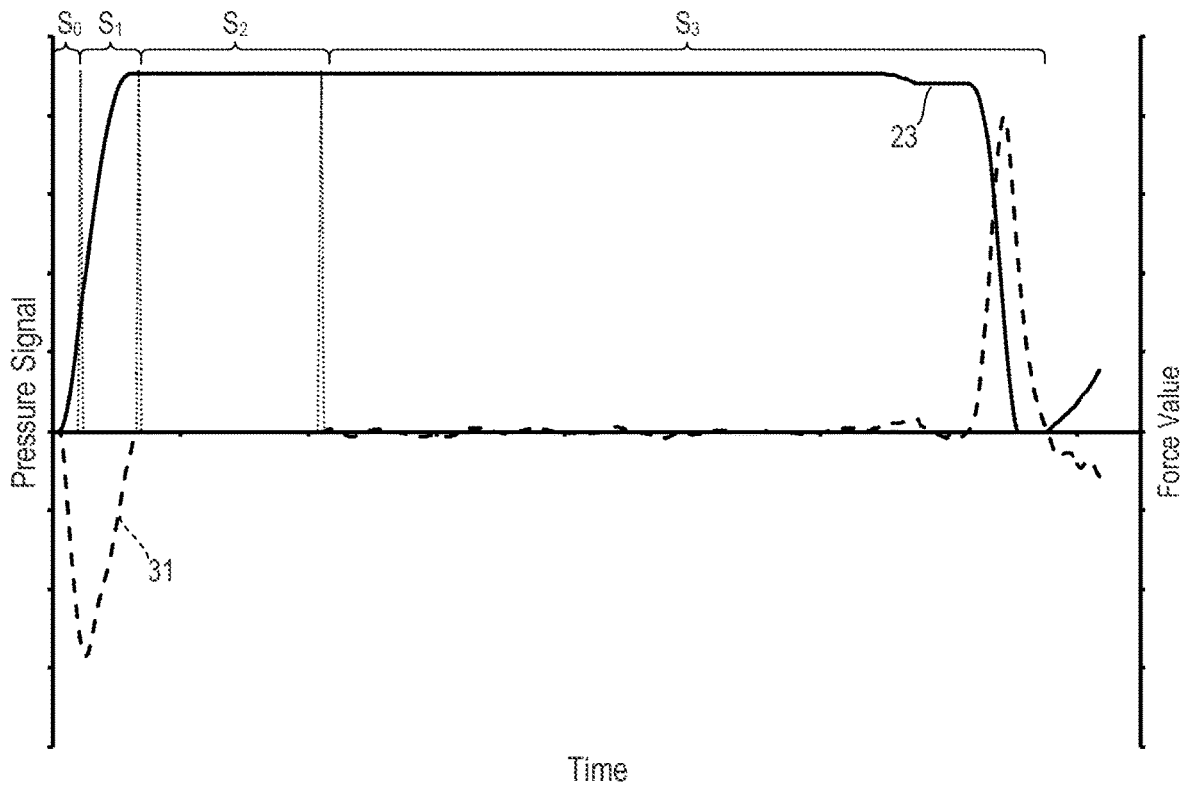
FIG. 6 plots force values obtained from the measured piezoelectric pressure signal plotted in FIG. 5.

Referring also to FIG. 6, measured force values 23 are shown which correspond to the measured piezoelectric pressure signal 30 shown in FIG. 5.

It may be observed that a measured piezoelectric pressure signal 30 may deviate from the idealised piezoelectric pressure signal 29 in several ways. Firstly, the start of a user interaction, for example determined using capacitance signals 20, may occur when the pressure signal 30 values, P(t), are not at zero DC offset. Instead, at a time t=o with respect to the beginning of the user interaction, the pressure signal 30 values P(t) may often display an initial DC offset value $P_0=P(O)$. This may occur for a variety of reasons such as, for example, a residual DC offset following a prior user interaction, a repeated touch before a signal from a prior user interaction has fully decayed, and so forth. The initial offset $P_0$ may be significant in practice. When a user's digit is charged with static, the initial offset $P_0$ may sometimes be accompanied by an initial false peak (not shown) which is believed to result from electrostatic discharge and/or capacitive coupling to the user's charged digit. Including an initial false peak (not shown) may result in inaccurate force outputs, However, simply setting gradient and value thresholds to exclude initial offsets $P_0$ and/or false peaks (not shown) will cause reduced sensitivity throughout the remainder of the user interaction.

Secondly, after an initial peak $P_1$ is reached, the pressure signal 30 values P(t) may decay to an offset value $P_{off}$ Which is not equal to zero. It has been observed that the offset value $P_{off}$ is generally the opposite sign to the initial peak $P_1$. It has also been observed that the offset value $P_{off}$ may change after each user interaction with a particular sensing electrode 5, 11, such that conventional DC offset correction and calibration methods may be less effective or ineffective. Furthermore, the pressure signal 30 values P(t) may, during a fraction of user interactions, display a false peak $P_2$ during which the pressure signal 30, P(t), overshoots the offset value $P_{off}$ before settling. The magnitude of a false peak $P_2$ can be significant during some user interactions.

As explained hereinbefore, simply setting gradient and value thresholds to exclude initial offsets and/or electrostatic discharge peaks, offset values $P_{off}$ and false peaks $P_2$ may cause reduced sensitivity throughout the remainder of the user interaction. However, simple conditional integration schemes may have sufficient resolution for some applications.

With reference to the examples plotted in FIGS. 5 and 6, the application of one example method of determining force values 23 based on a piezoelectric pressure signal 19, 22, 30 will be described.

As a user interaction progresses, the controller 15 updates a state register value between at least 4 distinguishable states, $S_0$, $S_1$, $S_2$ and $S_4$. The boundaries of and transitions between states $S_0$, $S_1$, $S_2$ and $S_3$ are indicated in FIGS. 5 and 6 for reference. In FIG. 6, the output force values 23 are plotted against the secondary y-axis.

When the user interaction begins, which in the FIGS. 5 and 6 example is determined based on capacitance signals 20, the user interaction is, initialised into a first, or initial state $S_o$. In this example, during the initial state $S_o$, the pressure signal 30 values P(t) are not used unless they have the appropriate sign for increasing load on the touch panel 1. For the examples shown in FIGS. 5 and 6, the appropriate sign is negative, but in other examples the pressure signal 30 values P(t) may increase in response to increasing applied force. In practice, this condition may be applied by generating processed pressure signal 31 values P*(t), according to:

$$P^*(t) = \begin{cases} P(t) & \text{if sign}[P(t)] \\ 0 & \text{otherwise} \end{cases} \quad (1)$$

During the initial state $S_0$, output force values 23, F(t) are obtained for each new sampling of the pressure signal 30 value P(t) by adding the corresponding processed signal 31 value P*(t) to the previous output force value 23, i.e. F(t)=F(t−δt)+P*(t), in which δt is a sampling interval. Since the processed signal 31 value P*(t) is set to zero when the pressure signal 30 value P(t) has the wrong sign for increasing applied force, such values do not contribute to the output force values 23, F(t).

Note that the output force values 23, F(t) are proportional to applied force, but to obtain an estimated measurement of absolute applied force, the force values 23, F(t) will need to be multiplied by corresponding scale factors. The scale factors may be obtained from calibration experiments using known applied force profiles. Scale factors may further depend on the location of a user interaction with the touch panel 1.

The transition to a second, primary loading, state $S_1$ may occur once a predetermined duration has elapsed since the start of the user interaction. The start of the user interaction can be determined known with good accuracy if capacitance signals 20 are obtained. During the primary loading state $S_1$, all sample pressure signal 30 values P(t) may be used unconditionally, i.e. the processed signal 31 may be set as P*(t)=P(t) and the output force value 23 F(t) may updated as F(t)=F(t−δt)+P*(t).

The transition to a third, or settling, state $S_2$ may occur when the pressure signal 30 values P(t) change sign, or after the controller 15 has conclusively detected the initial loading peak $P_1$. In the example shown in FIGS. 5 and 6, the state transition $S_1$ to $S_2$ occurs because the pressure signal 30 values P(t) have changed sign from negative to positive. Of course, in other examples where increasing the applied force causes the pressure signal 30 to increase, the transition may be detected in the opposite direction. The controller 15 may employ any suitable numerical technique for determining the approximate time and value of initial peak $P_1$. During the settling state the pressure signal 30 values P(t) may be not used, for example by setting the processed signal values 31, P*(t) as P*(t)=o. Thus, in FIGS. 5 and 6, it may be observed that in this example the processed signal 31 P*(t) clamps to zero during the false overshoot peak $P_2$.

The transition to a fourth, or stable state $S_3$ may occur once the pressure signal 30 values P(t) have stabilised at a DC offset $P_{off}$. In general, the DC offset $P_{off}$ may change slowly with time and/or following each loading/unloading peak of the pressure signal 30 values P(t). In some examples the controller 15 maintains a buffer of a number, $N_{buff}$ of previous pressure samples {P(t), P(t−δt), ..., P(t−δt($N_{buff}$+1))}, in which context t, t−δt, t−δt$N_{buff}$ are sampling times. When each new pressure sample P(t) is obtained, the first circuit 14 calculates a linear regression on the buffered samples {P(t), P(t–δt), . . . , P(t–δt($N_{buff}$+1))}. Once the magnitude of the slope, m, and the variance value, VAR, of the buffered pressure signal 30 samples {P(t), P(t–δt), . . . , P(t–δt($N_{buff}$+1))} are below pre-calibrated thresholds $m_{stable}$, $VAR_{stable}$, the controller 15 updates the state register value to the stable state $S_3$ and sets the mean value of the buffered samples {P(t), P(t–δt), . . . , P(t–δt($N_{buff}$+1))} as a offset correction value $P_{cor}$=mean({P(t), P(t–δt), . . . , P(t–δt($N_{buff}$+1))}).

During the stable state $S_3$, the processed pressure signal 31 values P*(t) may be set according to P*(t)=P(t)–$P_{cor}$. The output force values 23, F(t) may then updated according to:

$$F(t) = \begin{cases} F(t-\delta t) + P^*(t) & \text{if } |P^*(t)| > P_{noise} \\ F(t-\delta t) & \text{if } |P^*(t)| \leq P_{noise} \end{cases} \quad (2)$$

In which $P_{noise}$ is a noise threshold. For example, $P_{noise}$ may be set to a multiple of the standard deviation of the pressure signal 19, 22, 30 values P(t) during a calibration period in which there are no user interactions. The noise threshold $P_{noise}$ may be set to a multiple of five time the standard deviation of the pressure signal 19, 22, 30 values P(t) recorded during a calibration period. The noise threshold $P_{noise}$ may be pre-set, or may be periodically updated during quiet periods during which there are no user interactions detected, for example using the capacitive signals 20.

Changes in user applied force may be captured during the stable state $S_3$ with high sensitivity, whether they are increases or decreases in applied force. In the example shown in FIGS. 5 and 6, the small peak $P_3$ corresponding to a slight reduction in applied pressure is detected and the output force values 23, F(t) are correspondingly decreased.

During the stable state $S_3$, the threshold for detecting a change in the force applied to the touch panel 1 may be set to a lower value than would be possible for a conventional gradient and value based conditional integration applied to an entire signal. This is because effects such as static discharge/coupling, initial offset $P_0$, overshoot offset $P_{off}$ and false peaks $P_2$ may be screened out through the use of the other state register values $S_0$, $S_1$ and $S_2$.

In practice, the required offset correction $P_{cor}$ may slowly drift whilst a user maintains a constant applied input force. Additionally, if a user substantially increases or decreases the applied input force, this may change the offset $P_{off}$ to which the piezoelectric pressure signal 19, 22, 30 values P(t) decay. However the correction value $P_{cor}$ cannot simply be updated continuously whilst the buffer {P(t), P(t–δt), . . . , P(t–δt($N_{buff}$+1))} remains relatively flat (i.e. m<$m_{stable}$ and VAR<$VAR_{stable}$). If this was the case, any slight increase or decrease of the applied input force would be continuously removed from the processed pressure signal 31, P*(t), and would therefore not be detected.

Instead, during the stable state $S_3$ the controller 15 may perform linear regression on the buffer {P(t), P(t–δt), . . . , P(t–δt($N_{buff}$+1))} after each new sampling P(t). Whilst the buffer {P(t), P(t–δt), . . . , P(t–δt($N_{buff}$+1))}) remains flat (i.e. m<$m_{stable}$ and VAR<$VAR_{stable}$), the mean value of the buffered samples is compared against the correction value $P_{cor}$ and, if the magnitude of the difference |mean{P(t), P(t–δt), . . . , P(t–δt($N_{buff}$+1))})–$P_{cor}$|, is less than a threshold value $\Delta P_{cor}$, then the correction value $P_{cor}$ is unchanged. However, if the difference, |mean({P(t), P(t–δt), . . . , P(t–δt($N_{buff}$+1))})–$P_{cor}$|, exceeds a threshold value $\Delta P_{cor}$, then the correction value is updated to $P_{cor}$=mean({P(t), P(t–δt), . . . , P(t–δt($N_{buff}$+1))}).

The value of the threshold $\Delta P_{cor}$ may vary for each touch panel 1 and apparatus 13. A suitable value for a given touch panel 1 and apparatus 13 may be obtained by measuring data corresponding to a selection of known calibration force profiles. In a simple case, the threshold $\Delta P_{cor}$ may be set according the largest drift observed over the duration of a known, static applied force. Alternatively, the measurements obtained using known calibration force profiles may be used to generate a training set for a fitting, using the deviation of the known and measured forces as a cost function.

The stable state $S_3$ ends at the end of the user interaction.

The preceding method of determining force values 23 is merely exemplary and is not intended to unfit the claims appended to the present specification. The methods of the present specification may be applied to piezoelectric. force values 23, F(t) regardless of the specific method or conditional integration scheme used to obtain the force values 23, F(t).

Figure 7:
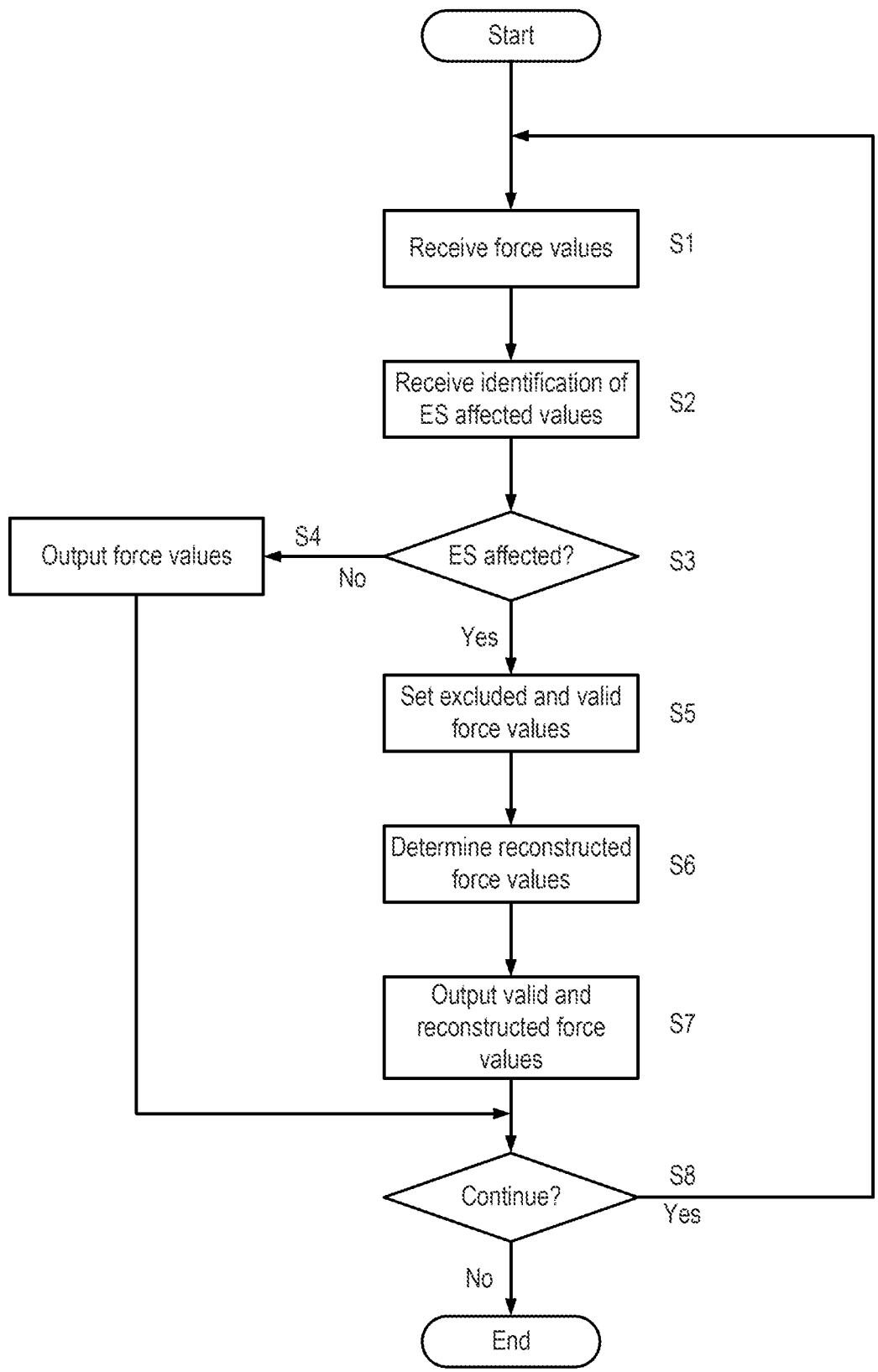
FIG. 7 is a process flow diagram of a first method of correcting force values to reduce or remove the influence of coupling to external electric fields.

First method: Referring also to FIG. 7, a first method of correcting force values 23 for coupling to external electric fields shall be explained.

Force values 23 are received from the touch panel 1, for example via the first circuit 14 and controller 15 (step S1). Each force value 23 corresponds to a particular physical location on the touch panel 1. For example, a force value 23 corresponding to the $n^{th}$ of N first sensing electrodes 5 spaced apart in the y-direction may be denoted F($y_n$) and a force value 23 corresponding to the $m^{th}$ of M second sensing electrodes 11 spaced apart in the x-direction may be denoted F($x_m$). Each sensing electrode 5, 11 is an equipotential, and therefore first sensing electrodes 5 elongated in the x-direction do not respond to variations in the x-direction, and similarly for each second sensing electrode 11. Each physical location $x_m$, $y_n$ may correspond to, for example, a centroid of the respective first or second sensing electrode 5, 11. In some examples, the first circuit 14 may aggregate piezoelectric charges $Q_{piezo}$ from two or more adjacent sensing electrodes 5, 11 it to output a single first piezoelectric pressure signal 19 for the grouped electrodes 5, 11. In such examples, each physical location $x_m$, $y_n$ may correspond to, for example, a centroid of the aggregated two or more first or second sensing electrodes 5, 11.

Figure 8:
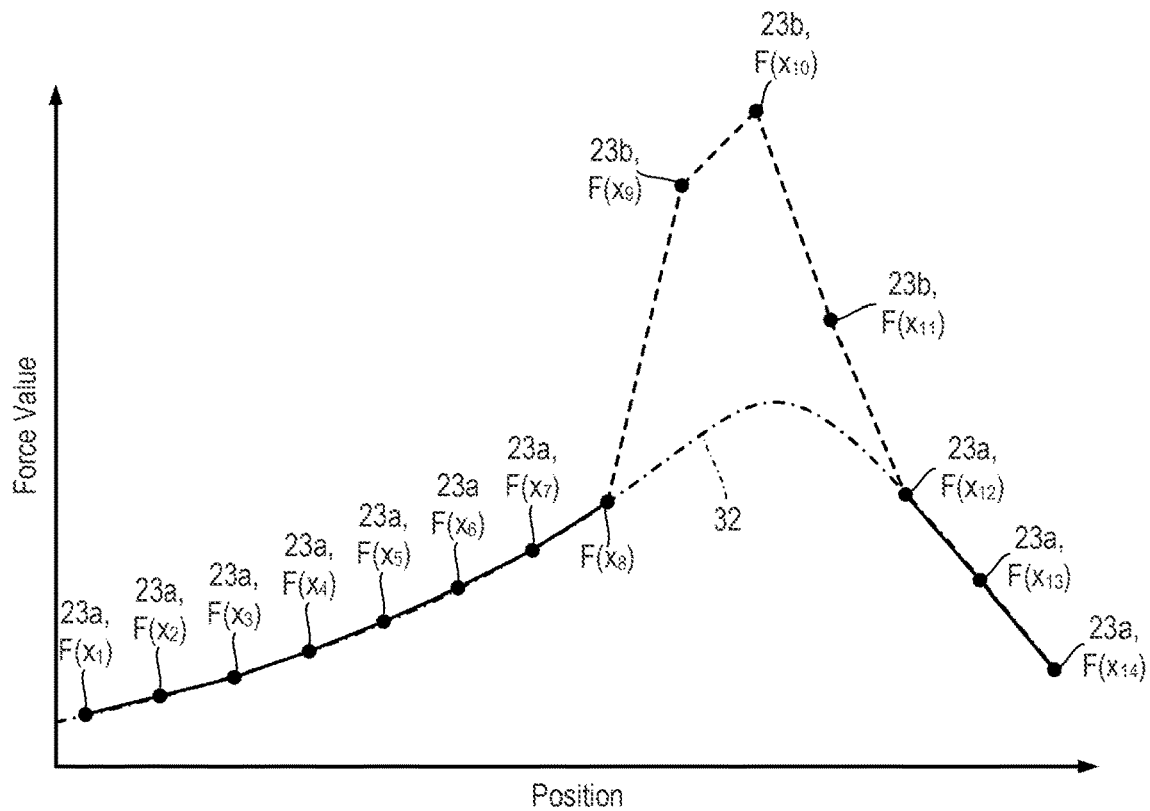
FIG. 8 illustrates a set of force values, including a subset of excluded force values.

Referring also to FIG. 8, a set of force values 23, F($x_m$) is schematically illustrated, including both valid force values 23a and excluded force values 23b.

Around the location of a user interaction, three of the force values F($x_9$), F($x_{10}$), F($x_{11}$) are influenced by coupling to an external electric field and consequently depart significantly from the underlying values 32 which correspond to the physical strain in the layer of piezoelectric material 7. Such external field couplings are believed to result from, amongst other sources, a user of the touch panel I becoming charged with static electricity.

An identification 24 of which, if any, of the force values 23, F($x_m$), F($y_n$) are influenced by coupling to external electric fields, is also received (step S2). Alternatively, the post-processing module 16 may make the determination of which, if any, of the force values 23, F($x_m$), F($y_n$) are influenced by coupling to external electric fields. A range of suitable methods for detecting the presence, or likely presence, of coupling to external electric fields are described hereinafter.

If none of the force values 23, F($x_m$), F($y_n$) are indicated to be influenced by coupling to external electric fields (step S3), then the force values 23, F($x_m$), F($y_n$) are output to the processor(s) (not shown) of a device (not shown) incorporating the apparatus 13 (step S4). The output force values 23, $F(x_m)$, $F(y_n)$ may be used as input to an operating system or software application which is being executed by the processor(s) (not shown) of a device (not shown) incorporating the apparatus 13.

However, in response to one or more force values 23, $F(x_m)$, $F(y_n)$ being identified as influenced by coupling to external electric fields (step S3), the corresponding force values 23, $F(x_m)$, $F(y_n)$ are set as excluded force values 23b, and the remaining force values are set as valid force values 23a (step S5). For example, the force values $P(x_k)$, $P(y_p)$ may be indicated as influenced by coupling to external electric fields, so that the valid force values 23a are $P(x_m)$, for all m≠k and $P(y_n)$ for all n≠p. In general, zero, one, or more than one force values 23a) may be excluded from the x or y force values, In other words, if a total number Mex of the measurements in the x-direction are excluded force values 23b then the valid force values 23a may be $P(x_m)$ for all m≠k, . . . , $k_{Mex}$ and if a total number Nex of the measurements in the y-direction are excluded force values 23b then the valid force values 23a may be $P(y_n)$ for all n≠$p_1$, . . . , $p_{Nex}$. When two or more force values 23b are excluded, they may or may not correspond to adjacent physical locations, for example $k_1$, . . . , $k_{Mex}$ need not be sequential.

In the example shown in FIG. 8, three force values $F(x_9)$, $F(y_{10})$, $F(x_{11})$ are excluded force values 23b, for Mex=3 and $k_1$9, $k_2$10, $k_3$=11. The remaining force values $F(x_1)$ to $F(x_8)$ and $F(x_{12})$ to $F(x_{14})$ are the valid force values 23a.

Reconstructed force values 25 are determined corresponding to the same physical locations as any excluded force values 23b by interpolating and/or extrapolating based on the valid force values 23a and respective physical locations (step S6). For example., the valid force values 23a, $F(x_m)$ (m≠$k_1$, . . . , $k_{Mex}$) and $P(y_n)$ (n≠$p_1$, . . . , $p_{Nex}$) may be used to generate reconstructed values $R(x_k)$, and $R(y_p)$ corresponding to the physical locations $x_k$, $y_p$ of the excluded force values 23b, $F(x_k)$, $F(y_p)$ (for k=$k_1$, . . . , $k_{Mex}$ and p=$p_1$, . . . , $p_{Nex}$). The process is one of interpolation when a reconstructed value $R(x_k)$, $R(y_p)$ is determined for a physical location $x_k$, $y_p$ which is spanned by a pair of valid force values 23a, and one of extrapolation when, for example, the excluded force values 23b, $F(x_k)$, $F(y_p)$ extend up to an edge of the touch panel 1.

Figure 9:
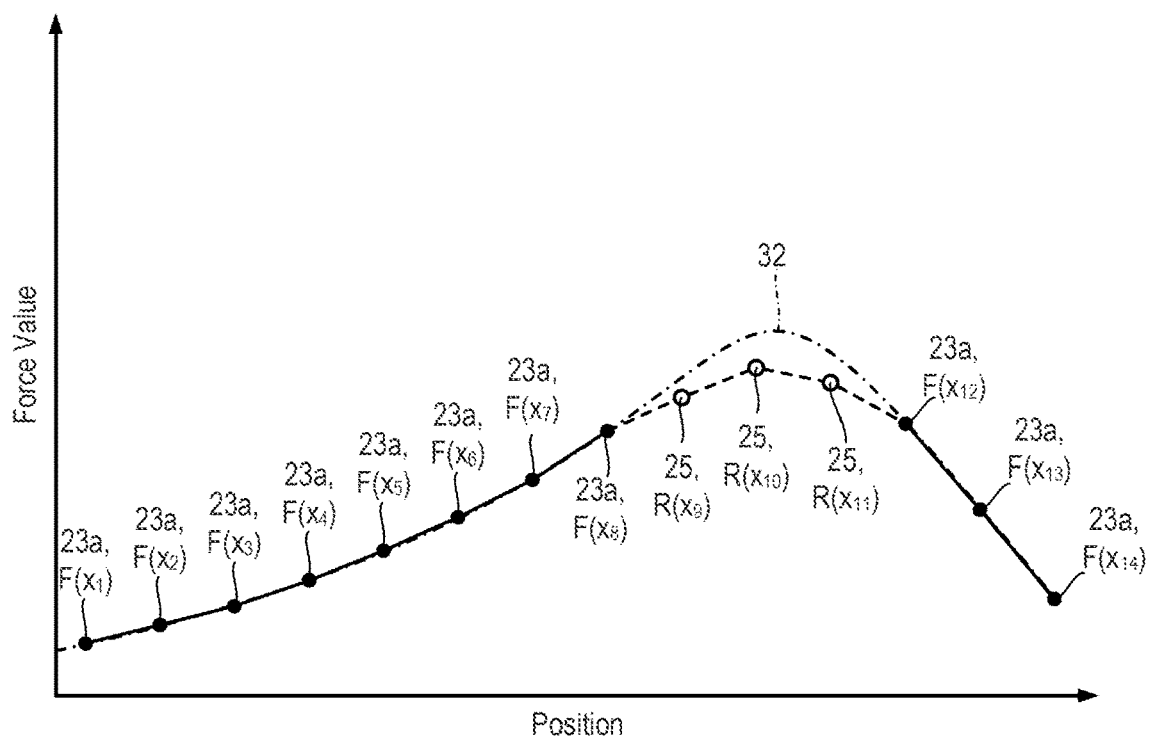
FIG. 9 illustrates reconstructed force values estimated to replace the excluded force values illustrated in FIG. 8.

Referring also to FIG. 9, reconstructed force values 25 are shown for the example shown in FIG. 8.

Reconstructed force values $R(x_9)$, $R(x_{10})$, $R(x_{11})$ have been interpolated based on the valid force values 23a, $F(x_1)$ to $F(x_8)$ and $F(x_{12})$ to $F(x_{14})$ and the respective physical locations.

A variety of methods may be employed in order to determine the reconstructed force values 25. For example, polynomial interpolation may be applied to the valid force values 23a, and the respective physical locations $x_m$, $y_n$ in order to interpolate and/or extrapolate one or more reconstructed force values 25. Polynomial interpolation may be performed using a Lagrange polynomial method, a Newton polynomial method, or any other suitable polynomial interpolation method.

In alternative examples, interpolating and/or extrapolating one or more reconstructed force values $R(x_k)$, $R(x_p)$ may be performed by fitting a force value model to the valid force values 23a and the respective physical locations. For example, a force value model may be fitted using a least squares fitting methodology. Force value models may be based on any complete set of basis functions including, but not limited to, polynomials, sine or cosine functions, and so forth.

In other alternative examples, one or more reconstructed force values $R(x_k)$, $R(y_p)$ may be interpolated and/or extrapolated by determining a spline interpolant connecting each of the valid force values 23a, $F(x_m)$ (m≠$k_1$, . . . , $k_{Mex}$) and $F(y_n)$ (n≠$p_1$, . . . , $p_{Nex}$) and the respective physical locations $x_m$ (m≠$k_1$, . . . , $k_{Mex}$), $y_n$ (n≠$p_1$, . . . , $p_{Nex}$). A spline interpolant may be quadratic or cubic. A spline may use linear interpolation for locations proximate to an edge of the touch panel, and higher order interpolation elsewhere. This may help to avoid unrealistic diverging values at locations close to an edge of the touch panel 1.

The valid force values 23a, $F(x_m)$ (m≠$k_1$, . . . , $k_{Mex}$) and $P(y_n)$ (n≠$p_1$, . . . , $p_{Nex}$) and the reconstructed pressure force values 25, $R(x_k)$, $R(y_p)$ (for k=$k_1$, . . . , $k_{Mex}$ and p=$p_1$, . . . , $p_{Nex}$) are output to the processor(s) (not shown) of a device (not shown) incorporating the apparatus 13 (step S7). The valid force values 23a, $F(x_m)$ (m≠$k_1$, . . . , $k_{Mex}$) and $P(y_n)$ (n≠$p_1$, . . . , $p_{Nex}$) and the reconstructed force values 25, $R(y_p)$, $R(y_p)$ (for k=$k_1$, . . . , $k_{Mex}$, and p=$p_1$, . . . , $p_{Mex}$) may be used as inputs to an operating system or software application which is being executed by the processor(s) (not shown) of a device (not shown) incorporating the apparatus 13.

Whilst the apparatus 13 remains active (step S8), further force values 23 are received (step S1).

Figure 10:
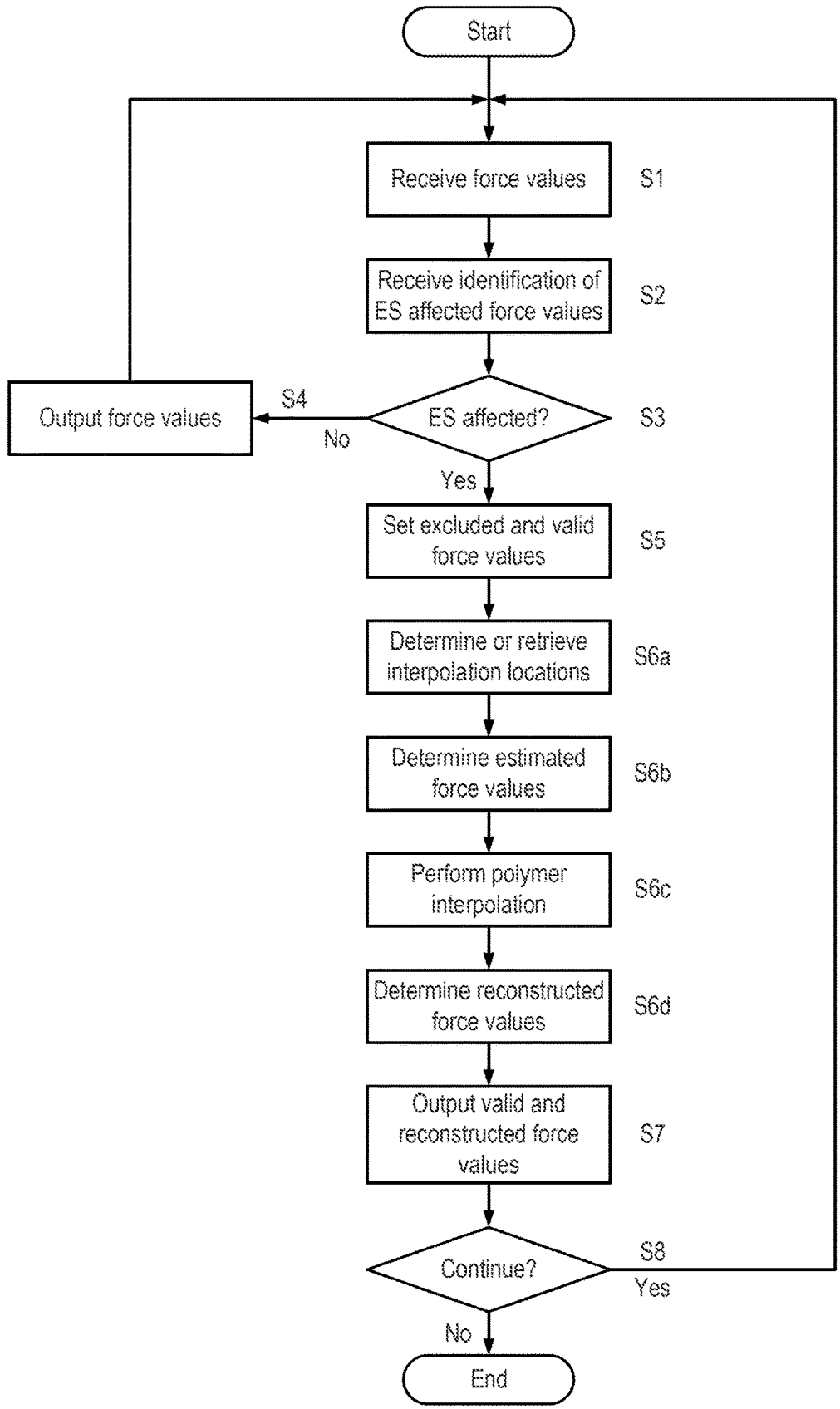
FIG. 10 is a process flow diagram of a second method of correcting force values to reduce or remove the influence of coupling to external electric fields.

Second method: Referring also to FIG. 10, a second method of correcting force values 23 for coupling to external electric fields shall be explained. The second method is an example of the first method which is specific to polynomial interpolation methods.

Steps of the second method which are identical to the first method will not be re-described (steps S1 to S5 and S7).

The post-processing module 16 determines a set of interpolation locations $x'_m$, $y'_n$, each interpolation location $y'_m$, $y'_n$ corresponding to one of the original physical locations $x_m$, $y_n$ (step S6a). In other words, the number of interpolation locations $x'_m$, $y'_n$ is equal to the number of force values 23 received. In other examples, the interpolation locations $x'_m$, $y'_m$, may be determined in advance and may be retrieved by the post-processing module 16 when required. The interpolation locations $x'_m$, $y'_n$, are distributed unevenly, with a higher spatial density towards the edges of the touch panel 1. By contrast, the physical locations $x_m$, $y_n$ corresponding to touch panel 1 electrodes 5, 11 are typically evenly spaced.

The reason for having an increased spatial density of interpolation locations $x'_m$, $y'_n$ towards the touch panel 1 edges is to try and avoid or minimise the occurrence of Runge's phenomenon, which refers to problematic oscillations which may be observed at the boundaries when polynomial interpolation is applied to equi-spaced interpolation points. The distribution of the interpolation locations $x'_m$, $y'_n$ may be chosen so as to mitigate or avoid Runge's phenomenon.

Figure 11:
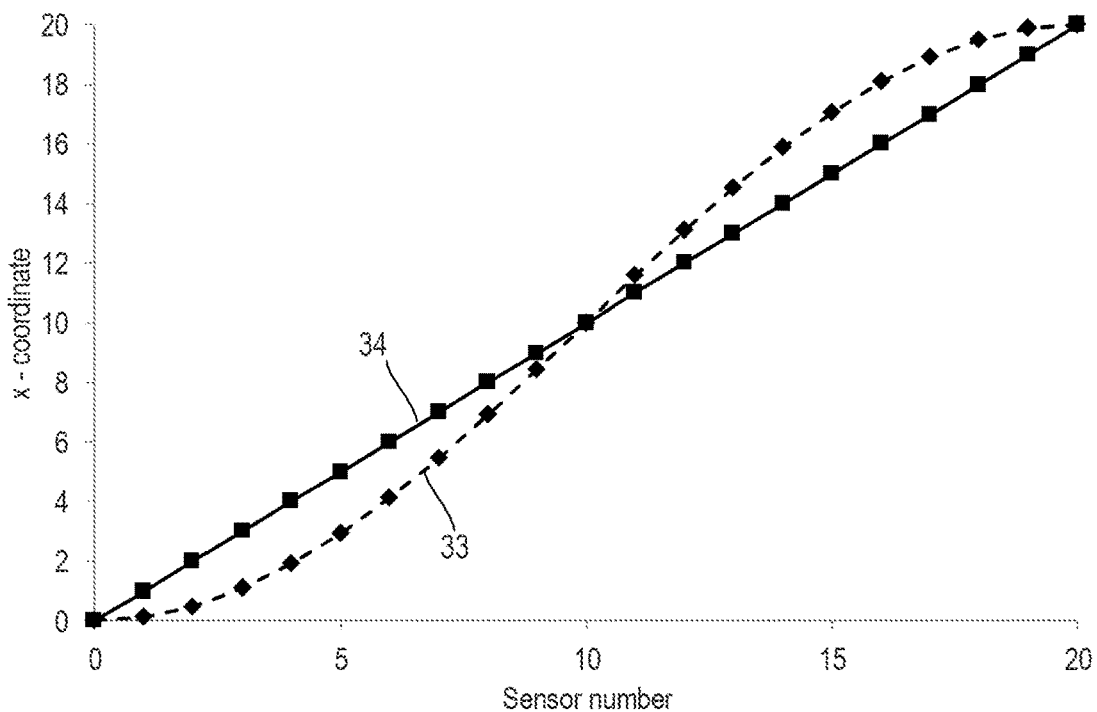
FIG. 11 illustrates a transformation from a set of equispaced physical locations to a set of interpolation locations.

For example, referring also to FIG. 11, the interpolation locations $x'_m$, $y'_n$ may be calculated as Chebyshev points 33 (also sometimes referred to as Chebyshev nodes), each corresponding to one of the original equi-spaced physical locations 34.

The Chebyshev point 33 corresponding to the $m^{th}$ of M physical locations $x_m$ spaced in the x-direction may be determined as:

$$x'_m = \frac{x_{min} + x_{max}}{2} + \frac{x_{max} - x_{min}}{2}\cos\left(\frac{m\pi}{M-1}\right) \quad (3)$$

In which $x_{min}$ is either $x_1$ or the start of the touch panel, $x_{minx}$ is either $x_N$ or the end of the touch panel and n=1, 2, ..., N. Preferably, $x_{min}=x_1$ and $x_{max}=x_N$. The Chebyshev point 33 corresponding to the $n^{th}$ of N physical locations $y_n$ spaced in the y-direction may be similarly determined.

Estimated force values $F_{est}(x'_m)$, $F_{est}(y'_n)$ are determined corresponding to some or all of the interpolation locations $x'_m$, $y'_n$(step S6b). The estimated force value $F_{est}(x'_m)$, $F_{est}(y'_n)$ for an interpolation location $x'_m$, $y'_n$ is determined based on interpolating or extrapolating valid force values 23a, $F(x_m)$ (m ≠$k_1$, ..., $k_{Mex}$) and $F(y_n)$ (n≠$p_1$, ..., $p_{Nex}$) from two or more physical locations $x_m$, $y_n$ proximate to or spanning the interpolation location $x'_m$, $y'_n$.

Interpolation option A: In some implementations, an estimated force value $F_{est}(x'_m)$, $F_{est}(y'_n)$ may be determined for every interpolation location $x'_m$, $y'_n$. Such examples may be over-constrained when the polynomial interpolant is subsequently calculated, and tend to be stable. However, over-constraining the interpolant may result in underestimating the reconstructed force values 25.

Interpolation option B: In other implementations, an estimated force value $F_{est}(x'_m)$, $F_{est}(y'_n)$ may only be determined for each interpolation location $x'_m$, $y'_n$ which corresponds to a valid force value 23a, $F(x_m)$ m≠$k_1$, ..., $k_{Mex}$) and $F(y_n)$ (n≠$p_1$, ..., $p_{Nex}$). An interpolation location $x'_m$, $y'_n$ corresponds to a force value 23, $F(x_m)$, $F(y_n)$ if the position of the interpolation location $x'_m$, $F(y_n)$ within a sequence of all the interpolation locations)$e_m$, $y'_3$, ordered by coordinate matches the position of the physical location $x_,$, $y_,$ associated with the force value 23, $F(x_n)$, $F(y)$ within a sequence of all the physical locations $x_m$, $y_n$ ordered by coordinate (see also Equation (3)). For example, referring again to FIGS. 8 and 9, estimated force values $F_{est}(x'_m)$, $F_{est}(y'_n)$ would not be calculated for the $9^{th}$, $10^{th}$ and $11^{th}$ interpolation locations $x'_9$, $x'_{10}$, $x'_{11}$. Interpolation option B may provide a better estimate of the reconstructed force values 25 because the calculation of the interpolating polynomial is less constrained through the region in which force values 23b have been excluded. However, when the excluded force values 23b are located close to an edge of the touch panel 1, this less constrained approach ma be less accurate than the previously explained over-constrained interpolation option A.

Hybrid interpolation option: In a refinement of the method, a selection between (option A) determining estimated force values $F_{est}(x'_m)$, $F_{est}(y'_n)$ for every interpolation location $x_m$, $y'_m$, or (option B) determining estimated force values $F_{est}(x'_m)$, $F_{est}(y'_n)$ only for those interpolation locations $x'_m$, $y'_n$, which correspond to a valid force value $F(x_m)$ (m≠$k_1$, ..., $k_{Mex}$) and $F(y_n)$ (n≠$p_1$, ..., $p_{Nex}$), may be made according to the physical locations $x_m$, $y_n$ corresponding to the excluded force values 23b. In this hybrid approach, when the excluded force values 23b are close to an edge of the touch panel the over-constrained (option A) may be used for stability. By contrast, when the excluded force values 23b are not close to an edge of the touch panel 1, the less constrained (option B) may be used to obtain less constrained estimates for the reconstructed force values 25.

It has been found that force values 23 affected by coupling to external electric fields are typically those which correspond to the physical locations $x_m$, $y_n$ which are closest to a user interaction. Consequently, in some implementations, the post-processing module 16 may also receive touch location data 27 (or "touch coordinates") corresponding to one more user interactions. The selection between whether to use interpolation option A or interpolation option B may be based on the received touch coordinates. Touch location data 27 may be determined based on the first pressure signals Alternatively, when capacitive Sensing is implemented, touch location data 27 may be determined using the capacitance signals 20.

Interpolation option C: In some implementations, the number of interpolation locations $x'_m$, $y'_n$ used may be intermediate between options A and B. For example, an estimated force value $F_{est}(x'_m)$, $F_{est}(y'_n)$ may be determined for each interpolation location $y'_m$, $y'_n$ which is spanned by a pair of adjacent physical locations $x_m$, $y_n$ which both correspond to valid force values 23a, $F(x_m)$ (m≠$k_1$, ..., $k_{Mex}$), $F(y_n)$ (n≠$p_1$, ..., $p_{Nex}$. Additionally, estimated force values $F_{est}(x'_m)$, $F_{est}(y'_n)$ may also be determined for each interpolation location $x'_m$, $y'_n$ which is within a predetermined distance of a physical location $x_m$, $y_n$ corresponding to a valid force value 23a, $F(x_m)$ (m≠$k_1$, ..., $k_{Mex}$), $F(y_n)$ (n≠$p_1$, ..., $p_{Nex}$).

First method of determining estimate force values: The estimated force values $F_{est}(x'_m)$, $F_{est}(y'_n)$ may be determined in a number of different ways, According to a first method of estimating force values $F_{est}(x'_m)$, $F_{est}(y'_n)$, each estimated force value $F_{est}(x'_m)$, $F_{est}(y'_n)$ is calculated according to linear interpolation using a pair formed from the valid force values immediately preceding and following the interpolation location $X'_m$, $y'_n$, itself.

Figure 12:
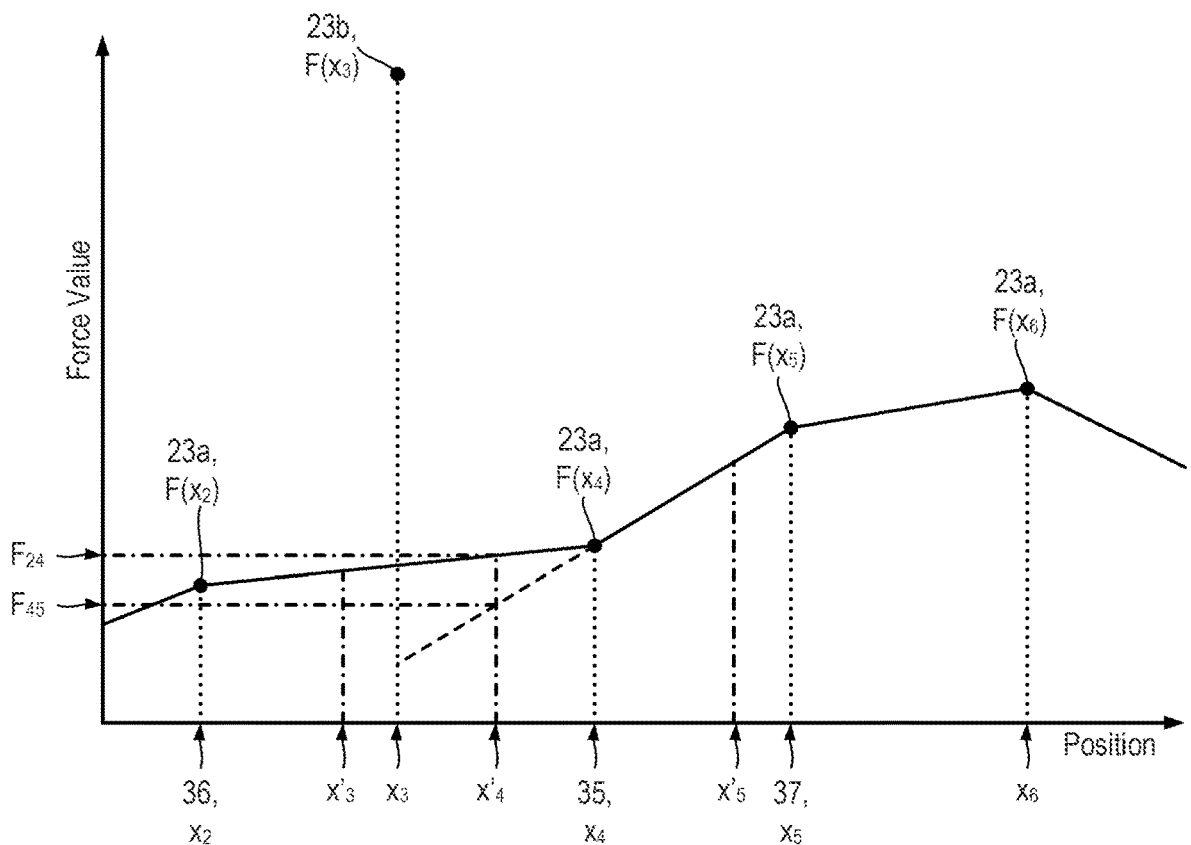
FIG. 12 illustrates determining estimated force values corresponding to a set of interpolation locations.

Referring also to FIG. 12, a first location 35, $K_4$ corresponds to valid force value 23a, $f(x_4)$, a second location 36, $x_2$ corresponds to valid force value 23a, $F(x_2)$, and a third location 37, $x_5$ corresponds to valid force value 23a, $F(x_5)$. The force value $F(x_3)$ is an excluded force value 23b because it was indicated as influenced by (or likely influenced by) coupling to external electric fields. An interpolation location $x'_4$ corresponding to the first location 35, $x_4$ is shown including possible values obtained by interpolation between $F(x_2)$ and $F(x_4)$ or extrapolation from $F(x_4)$ and $F(x_5)$. Additional interpolation locations $x'_3$, $x'_5$ are also indicated.

Applying the first method of estimating force values $F_{est}(x'_m)$, $F_{est}(y'_n)$ to the fourth interpolation location $x'_4$, the pair of valid force values 23a immediately preceding and following the interpolation location $x'_4$ consists of $F(x_2)$ at the second location 36, $x_2$ and $F(x_4)$ at the first location 35, $x_4$. The estimated force value $F_{est}(x'_4)$ may be interpolated as:

$$F_{est}(x'_4) = F_{24} = F(x_2) + (F(x_4) - F(x_2))\frac{x'_4 - x_2}{x_4 - x_2} \quad (4)$$

The physical location $x_3$ and the corresponding force value $F(x_3)$ are not used as the immediately preceding interpolation location, because these correspond to an excluded force value 23b.

Similarly, for the third interpolation location $x'_3$, the pair of valid force values 23a immediately preceding and following the interpolation location $x'_3$ again consists of $F(x_2)$ at the second location 36, $x_2$ and $F(x_4)$ at the first location 35, $x_4$. The estimated force value $F_{est}(x'_3)$ may be interpolated as:

$$F_{est}(x'_3) = F(x_2) + (F(x_4) - F(x_2))\frac{x'_3 - x_2}{x_4 - x_2} \quad (5)$$

For the fifth interpolation location $x'_5$, the pair of valid force values 23a immediately preceding and following the interpolation location $x'_5$ consists of $F(x_4)$ at the first location 35, $x_4$ and $F(x_5)$ at the third location 37, $x_5$. The estimated force value $F_{est}(x'_5)$ may be interpolated as:

$$F_{est}(x'_5) = F(x_4) + (F(x_4) - F(x_4))\frac{x'_5 - x_4}{x_5 - x_4} \quad (6)$$

When a particular interpolation location $x'_m$, $y'_n$ is not spanned by at least a pair of valid pressure values 23a, for example when an excluded pressure value 23b occurs close to an edge of the touch panel 1, then linear extrapolation based on the two closest valid pressure values 23a may be used instead of linear interpolation.

The first method of determining estimated force values may be applied to interpolation locations selected according to any one of interpolation options A to C or the hybrid interpolation option.

Second method of determining estimated force values: According to a second method of determining estimated force values $F_{est}(x'_m)$, $F_{est}(y'_n)$, each estimated force value $F_{est}(x'_m)$, $F_{est}(y'_n)$ may be determined by reference to estimation pair (1), a pair of a first valid force value 23a, and a second valid force value 23a which is the closest valid force value 23a preceding (with respect to a given coordinate system) the first valid force value 23a, and the respective physical locations $x_m$, $y_n$; or, estimation pair (2), a pair of the first valid force value 23a, and a third valid force value 23a which is the closest valid force value 23a following (with respect to the given coordinate system) the first valid force value 23a, the respective physical locations $x_m$, $y_n$.

The first valid force value 23a is always the valid force value 23 which corresponds to the interpolation location $x'_m$, $y'_n$, or if an interpolation location $x'_m$, $y'_n$, has no corresponding the valid force value 23a, the closest valid force value 23a. As defined in relation to interpolation option B, a valid force value 23a corresponds to an interpolation location $x'_m$, $y'_n$ if the position of the respective physical location $x'_m$, $y'_n$ within a sequence of all the physical locations $x_m$, $y_n$ ordered by coordinate matches the position of the interpolation location $x'_m$, $y'_n$ within a sequence of all the interpolation locations $x'_m$, $y'_n$ ordered by coordinate.

For example, referring again to FIG. 12 and considering the fourth interpolation location $x'_4$, the first valid pressure value 23a is $F(x_4)$ at the first location 35, $x_4$. In this case, the first valid pressure value 23a, $F(x_4)$ corresponds to interpolation location $x'_4$. The closest valid force value 23a preceding the first valid force value $F(x_4)$ is $F(x_2)$ at the second location $_3$6, $x_a$, so that estimation pair (i) consists of first valid force value $F(x_4)$, $x_4$ and second valid force value $F(x_2)$, $x_2$. The force value $F(x_3)$ at physical location $x_3$ is an excluded force value 23b and is not used. The closest valid force value 23a following the first valid force value $F(x_4)$ is $F(x_5)$ at the third location 37, $x_5$, so that the estimation pair (2) consists of first valid force value $F(x_4)$, $x_4$ and third valid force value $F(x_5)$, $x_5$.

Using the estimation pairs (1) and (2), the estimated pressure value $F_{(est)}(x'_4)$ may be calculated according to:

$$F_{est}(x'_4) = F(x_2) + (F(x_4) - F(x_2))\left(\frac{x'_4 - x_2}{x_4 - x_2}\right) \quad (7a)$$

or:

$$F_{est}(x'_4) = F(x_4) + (F(x_5) - F(x_4))\left(\frac{x'_4 - x_4}{x_5 - x_4}\right) \quad (7b)$$

Evidently, the value of $F_{est}(x'_4)$ will depend on whether Equation (7a) or Equation (7b) is used for the calculation. For example, as shown in FIG. 12, if estimation pair (1) is used according to Equation (7a), then $F_{est}(x'_4)$ will be interpolated as $F_{24}$, whereas if estimation pair (2) is used according to Equation (7b), then $F_{est}(x'_4)$ will be extrapolated as $F_{45} \ne F_{24}$.

The selection between estimation pairs (1) or (2) (e.g. between Equations (7a) and (7b)) may be made in dependence upon a cost function calculated for the first estimation pair (1) and the second estimation pair (2). Examples of suitable cost functions include:

$$C_1 = \sqrt{(F_b - F_a)^2 + (x_b - x_a)^2} + C_{std} \quad (8)$$

$$C_2 = |x_b - x_{int}| \times \left(1 + \frac{|x_a - x_{int}|}{|x_b - x_a|}\right)$$

$$C_3 = |x_a - x_{int}| \times \left(\left|\frac{F_b - F_a}{x_b - x_a}\right| + |x_b - x_a|\right)$$

$$C_4 = |x_a - x_{int}| \times \left(\left|\frac{F_b - F_a}{x_b - x_a}\right| + |x_b - x_a| + \max\{|x_b - x_{int}|, 1\}\right)$$

$$C_5 = |F_b - F_a| \times |x_a - x_{int}|$$

$$C_6 = (|x_a - x_{int}| + |x_b - x_a|) \times \left|\frac{F_b - F_a}{x_b - x_a}\right| + C_{std}$$

$$C_7 = |x_a - x_{int}| \times C_{std} \times \left|\frac{F_b - F_a}{x_b - x_a}\right|$$

$$C_8 = |x_a - x_{int}| \times \left|\frac{F_b - F_a}{x_b - x_a}\right| + C_{std}$$

$$C_9 = |F_b - F_a|$$

$$C_{10} = |x_b - x_{int}| \times \max\left\{\frac{|x_a - x_{int}|}{|x_b - x_a|}, \frac{|x_b - x_{int}|}{|x_b - x_a|}, 1\right\}$$

In which $C_1$ to $C_{10}$ are first to tenth cost functions, $F_a = F(x_a)$ and $F_b = F(x_b)$ are valid force values corresponding to respective physical locations $x_a$, $x_b$, $x_{int}$ is the interpolation location, and $C_{std}$ is a standard cost calculated according to:

$$C_{std} = \max\{|x_b - x_{int}|, 1\} \quad (9)$$

A chosen cost function $C_1, \ldots, C_{10}$ may be evaluated firstly using the first estimation pair (1) to provide the arguments $F_a$, $x_a$, $F_b$, $x_b$, and secondly using the second estimation pair (2) to provide the arguments $F_a$, $x_a$, $F_b$, $x_b$. The estimation pair (1), (2) which has the lowest value of the chosen cost function $C_1, \ldots, C_{10}$ is then used to interpolate or extrapolate the estimated force value $F_{est}(X_{int})$ corresponding to the interpolation location $X_{int}$. The hereinbefore listed cost functions $C_1, \ldots, C_{10}$ do not represent an exhaustive list, and other cost functions may be used instead of $C_1, \ldots, C_{10}$.

Returning to the example of the fourth interpolation point $x'_4$ shown in FIG. 12, if the first estimation pair (1) consisting of second valid force value $F(x_2, x_2)$ and first valid force value $F(x_4)$, $x_4$ has the lower value of the cost function $C_1, \ldots C_{10}$ then the estimated force value $F_{est}(x'_4)$ will be calculated as $F_{24}$ according to Equation (7a). However, if the second estimation pair (2) consisting of first valid force value $F(x_4)$, $x_4$ and third valid force value $F(x_5)$, $x_5$, has the lower value of the cost function $C_1, \ldots, C_{10}$, then the estimated force value $F_{est}(x'_4)$ will be calculated as $F_{45}$ using Equation (7b).

Applying the second method of determining estimated force values to the fifth interpolation location $x'_5$, the first valid force value 23 is $F(x_5)$ at physical location $x_5$, which corresponds to the fifth interpolation location $x'_5$. Estimation pair (1) consists of first valid force value $F(x_5)$, $x_5$ and second valid force value $F(x_4)$, $x_4$ (corresponding to interpolation of $F_{est}(x'_5)$ at $x'_5$). Estimation pair (2) consists of first valid force value $F(x_5)$, $x_5$ and third valid force value $F(x_6)$, $x_6$ (corresponding to extrapolation of $F_{est}(x'_5)$ at $x'_5$).

The application of the second method of determining estimated force values to the third interpolation location $x'_3$ is slightly different because the third interpolation location $x'_3$ has no directly corresponding valid pressure value 23a. Instead, the first valid force value 23a is selected as the closest to the third interpolation location $x'_3$, which is $F(x_2)$ at $x_2$. Then, the first estimation pair (1) consists of first valid force value $F(x_2)$, $x_2$ and second valid force value $F(x_1)$, $x_1$ (not shown in FIG. 12). In this case, the first estimation pair (1) corresponds to extrapolation of $Fest(x'_3)$, $x'_3$. The second estimation pair (2) consists of first valid force value $F(x_2)$, $x_2$ and third valid force value $F(x_4)$, $x_4$. In this case, the second estimation pair (1) corresponds to interpolation of $Fest(x'_3)$, $x'_3$.

Whether the second method of determining estimated force values corresponds to interpolation or extrapolation depends upon the values of the cost functions, and the relative locations of the interpolation locations $x'_m$, $y'_n$, the valid pressure values 23a and the excluded pressure values 23b.

Third method of determining estimated force values: A third method is similar to the second method, except that third and fourth estimation pairs (3), (4) are selected according to slightly different criteria from the first and second estimation pairs (1), (2) of the second method.

For each interpolation location $x'_m$, $y'_n$, a first valid force value 23a is identified in the same way as for the second method. However, unlike the second method in which the first valid force value was part of the first and second estimation pairs (1), (2), the third and fourth estimation pairs (3), (4) do not include the first valid force value 23a.

Using the third method of determining estimated force values $F_{est}(x'_m)$, $F_{est}(y'_n)$, each estimated force value $F_{est}$ $(x'_m)$, $F_{est}(y'_n)$ may be determined by reference to:

estimation pair (3) which consists of the two valid pressure values 23a which are closest to the first valid pressure value 23a in any direction; or estimation pair (4) which consists of the closest valid pressure value 23a to the first valid pressure value in the positive coordinate direction and the closest valid pressure value 23a to the first valid pressure value 23a in the negative coordinate direction.

The cost functions $C_1, \ldots, C_{10}$ are calculated for the third and fourth estimation pairs (3), (4), and the pair (3), (4) having the lowest value of the cost function $C_1, \ldots, C_{10}$ is used to interpolate or extrapolate the estimated force value $F_{est}(x'_m)$, $F_{est}(y'_n)$.

Referring again to the example shown in FIG. 12 in relation to the fourth interpolation location $x'_4$. The first valid pressure value 23a corresponding to the fourth interpolation location $x'_4$ is $F(x_4)$ at physical location $x_4$. The third estimation pair (3) includes $F(x_5)$ at $x_5$, however, $F(x_6)$ at $x_6$ and $F(x_2)$ at $x_2$ are equally close. Such ambiguities in selecting the third estimation pair (3) may be resolved in a variety of ways. For example, minimum spacing between the valid force values may be prioritised, in which case the third estimation pair (3) might consist of $F(x_5)$ at $x_5$, and $F(x_6)$ at $x(_6$. Alternatively, the distance to the interpolation point $x'_4$ may be used to resolve the ambiguity, in which case the third estimation pair (3) would consist of $F(x_5)$ at $x_5$ and $F(x_2)$ at $x_2$. Alternatively, when there are ambiguities, a chosen cost function $C_1, \ldots C_{10}$ may be calculated for all possible pairings. In general, any suitable strategy may be used to resolve ambiguities in selection of the third estimation pair (3).

The fourth estimation pair (4) does not experience the same issue with ambiguity, and consists of $F(x_5)$ at $x_5$ and $F(x_2)$ at $x_2$. It may be observed that the third and fourth estimation pairs (3), (4) may be identical in some circumstances, The same procedures may be followed in order to obtain estimated force values $F_{est}(x'_m)$, $F_{est}(y'_n)$ in the x- and y-directions. The cost functions $C_1$ to $C_{10}$ are merely examples, and any suitable cost function may be used to determine which pair of physical locations 35, 36, 37 to use for determining estimated force values $F_{est}(x'_m)$, $F_{est}(y'_n)$.

However, in other implementations, the estimated force values $F_{est}(x'_m)$, $F_{est}(y'_n)$ may be calculated in other ways. For example, quadratic or cubic splines may be calculated which connect all of the valid force values 23a, $F(x_m)$ ($m \neq k_1, \ldots, k_{Mex}$). The estimated force values $F_{est}(x'_m)$ may then be calculated for some or all of the interpolation locations $x'_m$ using the corresponding spline segment. Estimated force values $F_{est}(y'_n)$ may then be calculated for some or all of the interpolation locations $y'_m$, $y'_n$ in the same way.

Once the interpolation locations $y'_m$, $y'_n$ and corresponding estimated force values $F_{est}(x'_m)$, $F_{est}(y'_n)$ have been determined, these are used as inputs to generate an interpolating polynomial (step S6c). As explained hereinbefore, any suitable polynomial interpolation method may be used. One suitable example is Lagrange interpolation.

Calculation of Lagrange polynomial for interpolation option A: Values for every interpolation location $x'_m$, $y'_n$ and the corresponding estimated force values $F_{est}(x'_m)$, $F_{est}(y'_n)$ are used. Thus, there, are a total of M interpolation points in the x-direction and the Lagrange interpolation polynomial is given by:

$$L_x(x) = \Sigma_{m=1}^{M} F_{est}(x'_m) \times l_m(x) \tag{10}$$

in which $m=1, \ldots, M$, and $l_m(x)$ is a Lagrange basis polynomial given by:

$$l_m(x) = \prod_{j \neq m} \frac{x - x_j}{x_m - x_j} \tag{11}$$

in which $j=1, \ldots, M$.

Similarly, there are a total of N interpolation points in the y-direction and the Lagrange interpolation polynomial is given by:

$$L_y(y) = \Sigma_{n=1}^{N} F_{est}(y'_n) \times l_n(y) \tag{12}$$

in which $m=1, \ldots, M$, and $l_n(y)$ is a Lagrange basis polynomial given by:

$$l_n(y) = \prod_{j \neq n} \frac{y - y_j}{y_n - y_j} \qquad (13)$$

Calculation of Lagrange polynomial for interpolation option B: As described hereinbefore, only interpolation locations x'm, y'n corresponding to Valid force values are used. Thus, there are a total of M−Mex interpolation points in the x-direction and the Lagrange interpolation polynomial is calculated using this smaller number of interpolation points. Similarly, there are a total of N−Nex interpolation paints in the y-direction using interpolation option B.

Calculation of reconstructed force values: Once the Lagrange interpolation polynomials Lx(x), Ly(y) have been determined, these may be used to calculate reconstructed force values 25 by substituting the physical locations xm, yn corresponding to the excluded force values 23b into the Lagrange interpolation polynomials Lx(x), Ly(y) (step S6d). For example, R(xk)=Lx(xk) for k=k1, . . . , kMex, and R(yp)=Ly(yp) for p=p1, . . . , pNex.

Figure 13:
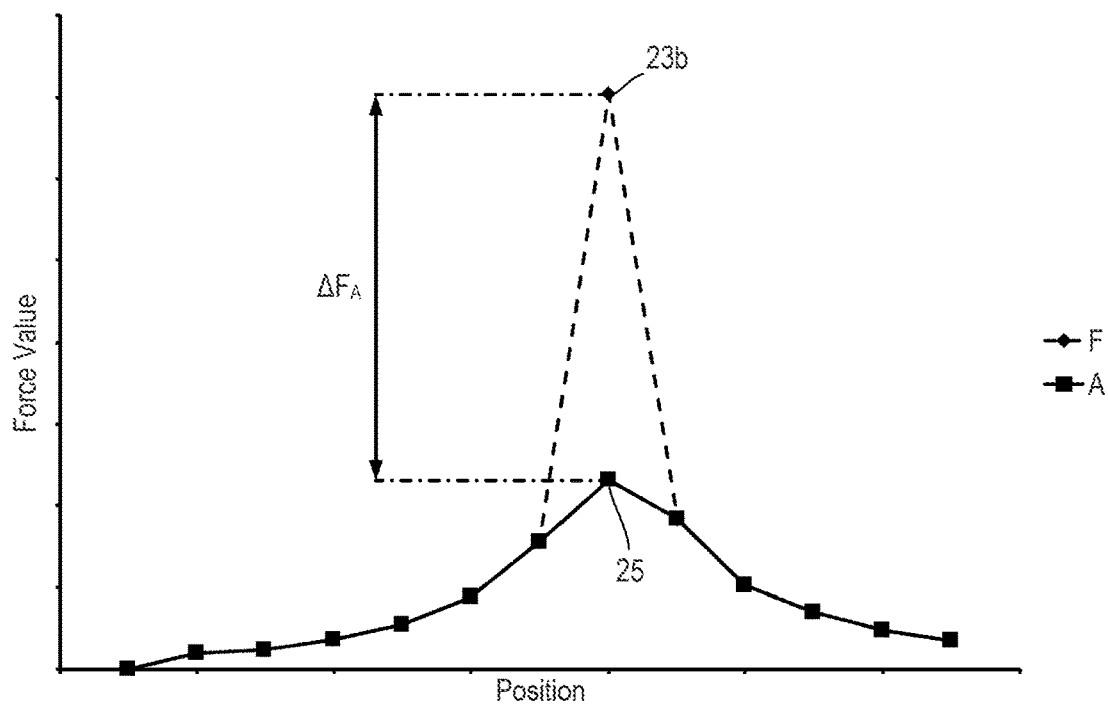
FIG. 13 plots a comparison of measured force values against reconstructed force values determined using Lagrange polynomial interpolation using a first set of interpolation locations.
Figure 14:
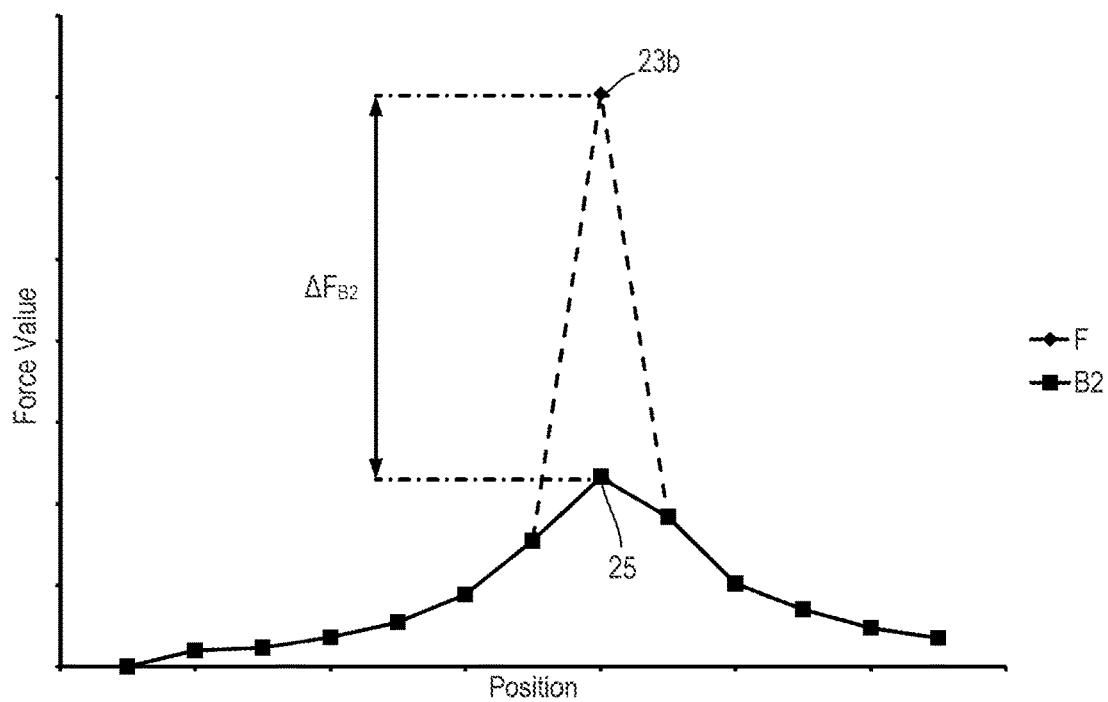
FIG. 14 plots the measured force values from FIG. 13 against reconstructed force values determined using Lagrange polynomial interpolation using a second set of interpolation locations.

Experimental data: Referring also to FIG. 13, a comparison of original force values 23 and reconstructed force values 25 is shown.

The original force values 23 are labelled "F" and drawn with a dashed line and diamond markers. There was one excluded force value 23b. The valid force values 23a and a reconstructed force value 25 calculated according to interpolation option A using the second method of determining estimated force values and a Lagrange polynomial interpolant are labelled "A" and drawn with a solid line and square markers. The original force values 23 appear to show an unrealistically sharp peak in consequence of coupling to external electric fields. When the affected force value 23b is excluded and replaced using the reconstructed force value 25, the peak value is decreased significantly by an amount $\Delta F_A$. In this way, a more physically realistic and accurate estimate of the peak for value applied by a user interaction may be determined.

Referring also to FIG. 14h, the original force values 23 shown in FIG. 13 are compared against a reconstructed force value 25 obtained according to interpolation option B, using the second method of determining estimated force values.

The original force values 23 are labelled "F" and drawn with a dashed line and diamond markers. The valid force values 23a and a reconstructed force value 25 calculated according to interpolation option B, using the second method of determining estimated force values, and a Lagrange polynomial interpolant are labelled "B2" and drawn with a solid line and square markers.

Similarly to interpolation option A, a more physically realistic and accurate estimate of the peak force value applied by a user interaction may be determined using interpolation option B and the second method of determining estimated force values $F_{est}(x'_m)$, $F_{est}(y'_n)$.

Figure 15:
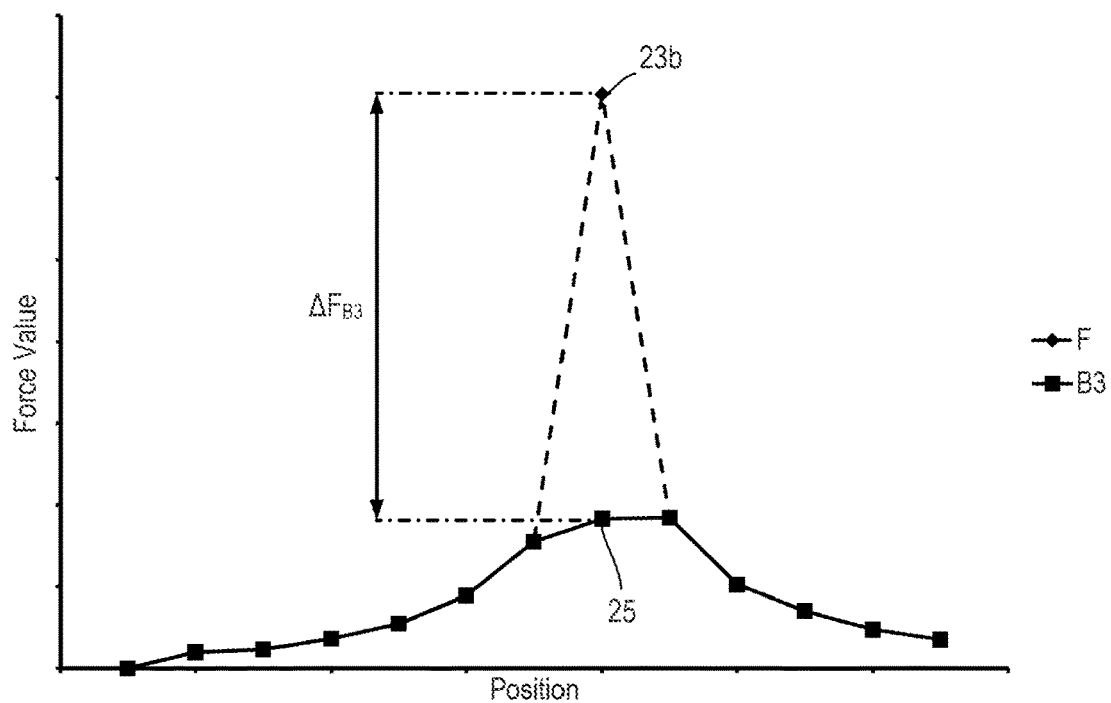
FIG. 15 plots the measured force values from FIG. 13 against reconstructed force values determined using Lagrange polynomial interpolation using the second set of interpolation locations, and a different method of estimating force values at the interpolation locations compared to FIG. 14.

Referring also to FIG. 15, the original force values 23 shown in FIG. 13 are compared against a reconstructed force value 25 obtained according to interpolation option B, using the third method of determining estimated force values.

The original force values 23 are labelled "F" and drawn with a dashed line and diamond markers, The valid force values 23a and a reconstructed force value 25 calculated according to interpolation option B, using the third method of determining estimated force values, and a Lagrange polynomial interpolant are labelled "B3" and drawn with a solid line and square markers, Similarly to interpolation option A, a more physically realistic and accurate estimate of the peak force value applied by a user interaction may be determined using interpolation option B and the third method of determining estimated force values $F_{est}(x'_m)$, $F_{est}(y'_n)$.

Figure 16:
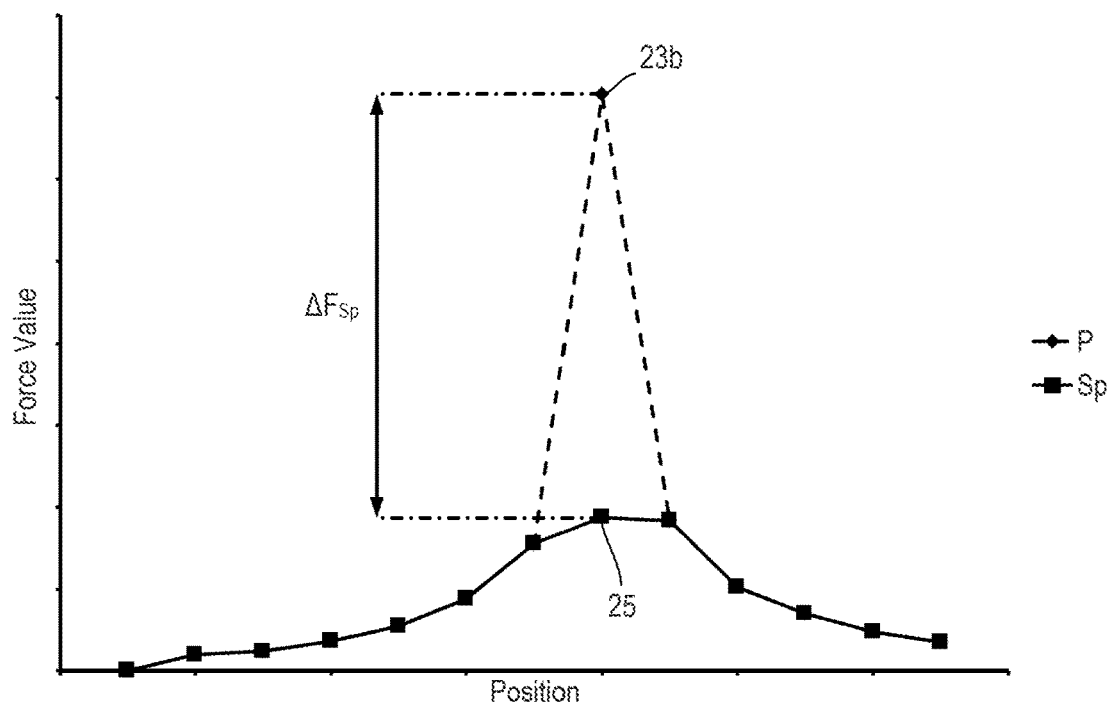
FIG. 16 plots the measured force values from FIG. 13 against reconstructed force values determined using a cubic spline interpolant.

Referring also to FIG. 16, the original force values 23 shown in FIG. 13 are compared against a reconstructed force value 25 obtained using a cubic spline.

The original force values 23 are labelled "F" and drawn with a dashed line and diamond markers. The valid force values 23a and a reconstructed force value 25 calculated using a cubic spline interpolant are labelled "Sp" and drawn with a solid line and square markers. Unlike the reconstructed force values 25 shown in FIGS. 13 to 15, the reconstructed force value 25 shown in FIG. 16 has not been obtained using polynomial interpolation. Instead, cubic splines connecting the valid force values 23a were obtained, and the spline segment spanning a physical location corresponding to the excluded force value 23b was sampled at that physical location to obtain a reconstructed force value 25. Similarly to the polynomial interpolation using interpolation options A, or B, a more physically realistic and accurate estimate of the peak force value applied by a user interaction may be determined using a cubic spline interpolant.

Figure 17:
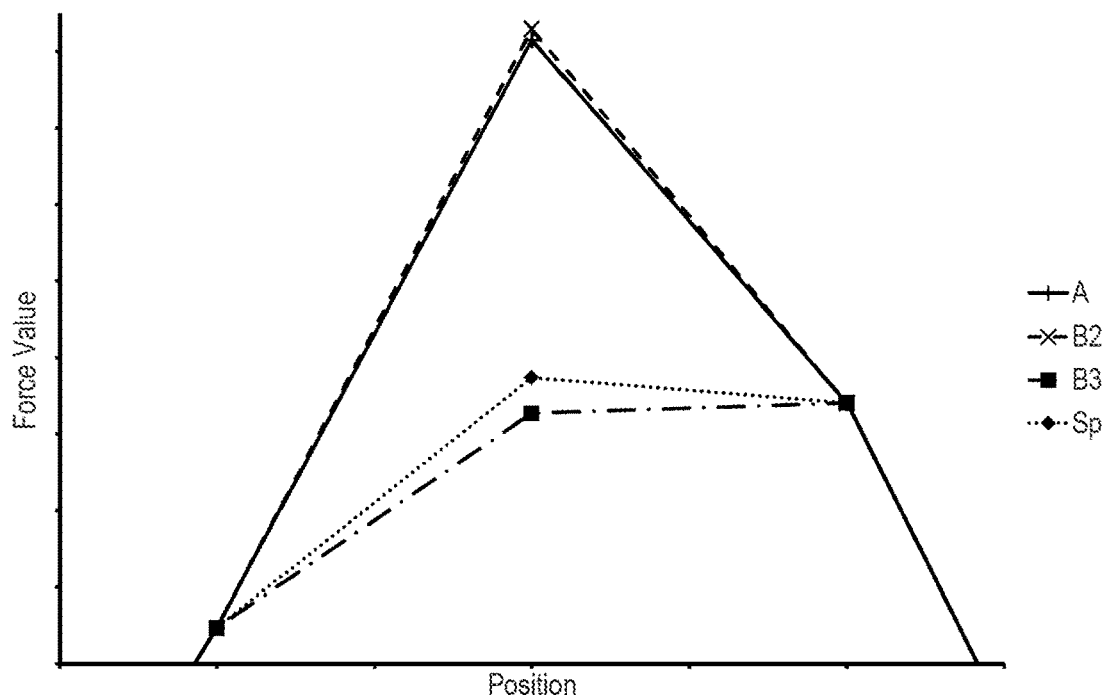
FIG. 17 plots a comparison of the reconstructed force values plotted in FIGS. 13 to 16.

Referring also to FIG. 17, a comparison of the reconstructed force values 25 shown in FIGS. 13 to 16 is shown. The axes of FIG. 17 correspond to smaller ranges of force value and position, in order to permit more detailed comparison of the reconstructed force values 25.

Figure 18:
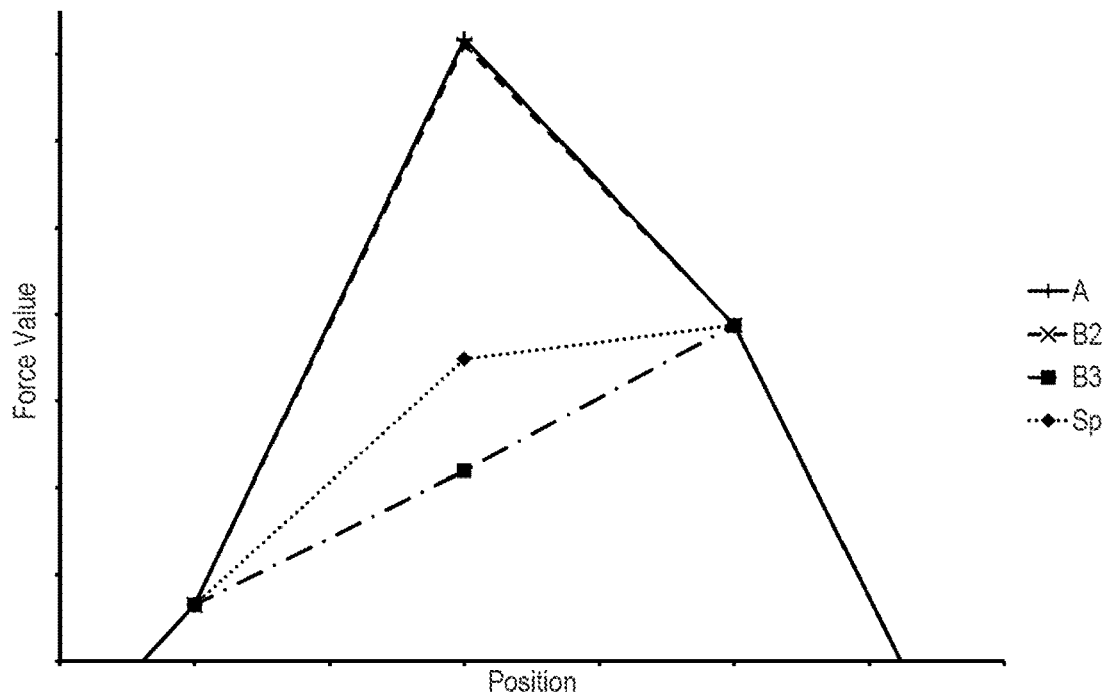
FIG. 18 is the same as FIG. 17, except that the data plotted corresponds to a different user interaction.

Referring also to FIG. 18, a comparison is shown of reconstructed force values 25 obtained using Lagrange polynomial interpolation according to interpolation option A, interpolation option B using either the second method (B2) of determining estimated force values $F_{est}(x'_m)$, $F_{est}(y'_n)$ or the third method (B3) of determining estimated force values $F_{est}(x'_m)$, $F_{est}(y'_n)$, and also interpolation using a cubic spline. The data shown in FIG. 18 corresponds to a different user interaction than the data shown in FIG. 17, but was prepared using identical methods.

It may be observed that the variations amongst the different methods for obtaining reconstructed force value 25 are substantially smaller than the differences $\Delta F_A$, $\Delta F_{B2}$, $\Delta F_{B3}$ and $\Delta F_{Sp}$ between the reconstructed force values 25 and the original excluded force value 23b which includes the influence of coupling to external electric fields. In particular, because the coupling to external electric fields may be larger than the actual pressure signal and depends on, for example, an amount of static charge, affected values can appear substantially uncorrelated to the amount of force a user is applying.

By contrast, although estimated, the reconstructed force values 25 offer a more realistic measure of the applied force. Importantly, through interpolating and/or extrapolating the valid force values 23a, the reconstructed force values 25 may be expected to be strongly correlated to how much force a user is actually applying.

Figure 19:
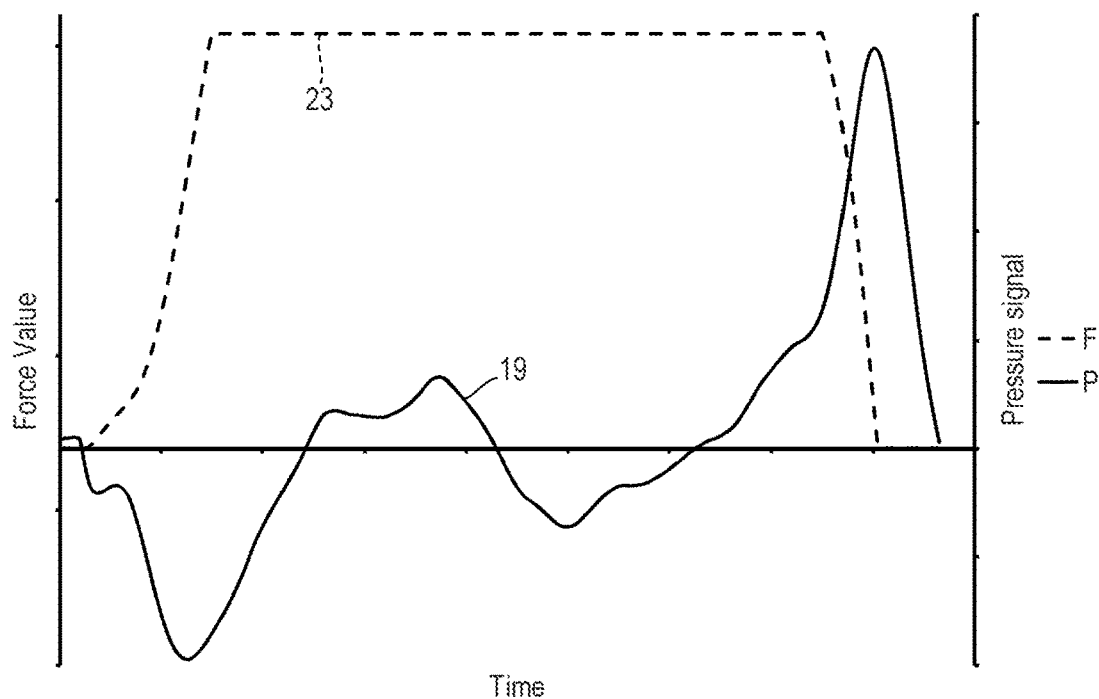
FIG. 19 plots a measured piezoelectric pressure signal and the corresponding force values against time, for a user interaction which was not influenced by coupling to external electric fields.

Referring also to FIG. 19, an example of a received first pressure signal 19, P(t) and the corresponding force values 23, F(t) are shown as a function of time for a user interaction which was not influenced by coupling to external electrostatic fields.

The force values 23, F(t) are plotted as a dashed line labelled "F" against the primary vertical axis and the pressure signal 19, P(t) is plotted as a solid line labelled. "P" against the secondary axis. It may be observed that a user has applied and held a relatively constant applied force, then released the force. Both the force values 23, F(t) and the pressure signal 19, P(t) exhibit expected behaviours.

Figure 20:
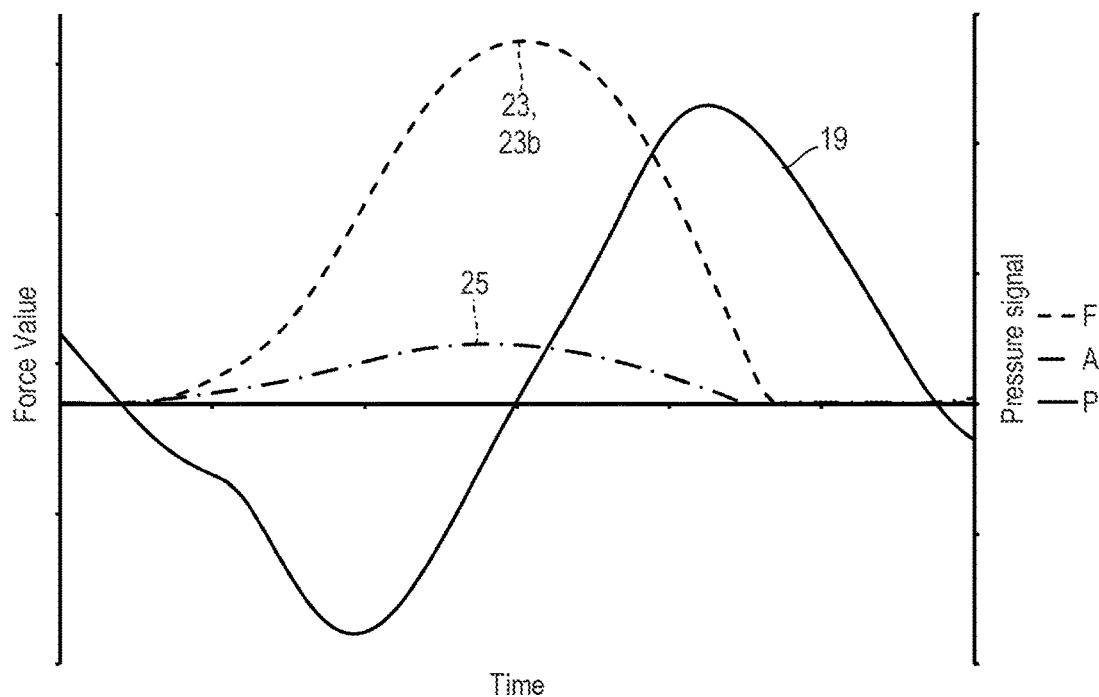
FIG. 20 plots a measured piezoelectric pressure signal, the corresponding force values, and a set of reconstructed force values against time, for a user interaction which was influenced by coupling to external electric fields.

Referring also to FIG. 20, an example of a received first pressure signal 19, P(t) and the corresponding force values 23, F(t) are shown as a function of time for a user interaction which was influenced by coupling to external electrostatic fields.

The data shown in FIG. 20 were obtained by a user scuffing their footwear on a synthetic fibre carpet, before tapping a touch panel 1. Data are shown for the sensing electrode 5, 11 closest to the location which the user tapped. Reconstructed force values 25 are also shown, plotted as a chained line labelled "A". The reconstructed force values 25 were obtained using Lagrange polynomial interpolation using interpolation option A. In the data plotted in FIG. 20, the force values 23 were excluded force values 23b, and the reconstructed force values 25 were obtained using valid force values 23a from adjacent electrodes 5, 11. It may be observed that if the raw output force values 23 were relied upon, the applied pressure would be significantly overestimated. As a consequence of the output force values 23 being potentially dominated by the coupling to static charge on the user, the measurement of applied force ma become substantially uncorrelated to the amount of force which a user is applying. By contrast, the reconstructed force values 25, being based on the adjacent valid force values 23a, which may be only weakly coupled to, for example a static charge on the user's digit, may remain strongly correlated to the force which the user is actually applying.

Figure 21:
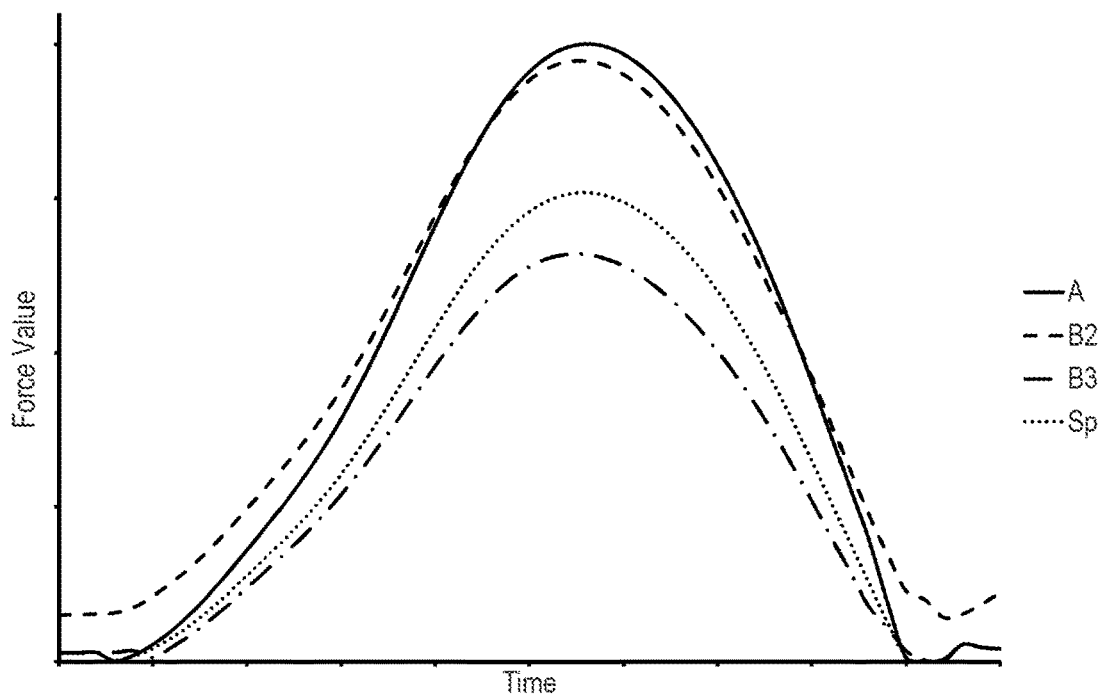
FIG. 21 plots a comparison of reconstructed force values obtained using Lagrange polynomial interpolation using first and second sets of interpolation locations, and obtained using a cubic spline interpolant.

Referring also to FIG. 21, a comparison is shown between the reconstructed force values 25 plotted in FIG. 20 and three alternative methods of obtaining the reconstructed force values 25.

The reconstructed force values 25 calculated according to interpolation option A using a Lagrange polynomial interpolant are labelled "A" and drawn with a solid line. The reconstructed force values 25 calculated according to interpolation option B using the second method of determining estimated force values $F_{est}(x'_m)$, $F_{est}(y'_n)$ and a Lagrange polynomial interpolant are labelled "B2" and drawn with a dashed line. The reconstructed force values 25 calculated according to interpolation option B using the third method of determining estimated force values $F_{est}(x'_m)$, $F_{est}(y'_n)$ and a Lagrange polynomial interpolant are labelled "B3" and drawn with a chained line. The reconstructed force values 25 calculated using a cubic spline interpolant are labelled "Sp" and drawn with a dotted line. It may be observed, with reference again to FIG. 20, that the deviations amongst the alternative methods of estimating the reconstructed force values 25 are substantially less than the differences between any one set of reconstructed values 25 and the original force values 23, 23b including the influence of coupling to external electric fields. More importantly, because the reconstructed values 25 are estimated without using the excluded force values 23b, the reconstructed force values 25 retain a correlation to the force which a user is actually applying to the touch panel 1.

Figure 22:
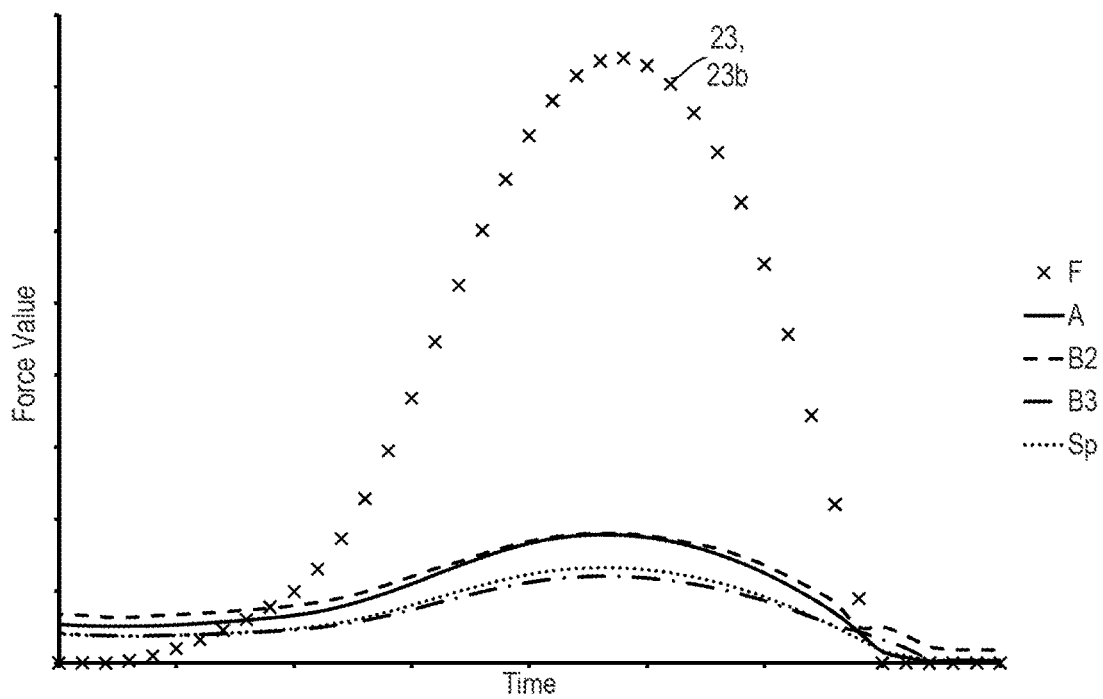
FIG. 22 plots a comparison of force values with reconstructed force values obtained using Lagrange polynomial interpolation using first and second sets of interpolation locations, and obtained using a cubic spline interpolant.

Referring also to FIG. 22, original force values 23, 23b affected by coupling to external electric fields are plotted against time for comparison against reconstructed force values 25 obtained used a variety of methods. The data plotted in FIG. 22 correspond to a different user interaction to the data plotted in FIGS. 20 and 21.

The original force values 23 are labelled "F" and plotted using cross markers without a line. In the data plotted in FIG. 22, the force values 23 were excluded force values 23b, and the reconstructed force values 25 were obtained using valid force values 23a from adjacent electrodes 5, 11. The reconstructed force values 25 calculated according to interpolation option A using a Lagrange polynomial interpolant are labelled "A" and drawn with a solid line. The reconstructed force values 25 calculated according to interpolation option B using the second method of determining estimated force values $F_{est}(x'_m)$, $F_{est}(y'_n)$ and a Lagrange polynomial interpolant are labelled "B2" and drawn with a dashed line, The reconstructed force values 25 calculated according to interpolation option B using the third method of determining estimated force values $F_{est}(x'_m)$, $F_{est}(y'_n)$ and a Lagrange polynomial interpolant are labelled "B3" and drawn with a chained line. The reconstructed force values 25 calculated using a cubic spline interpolant are labelled "Sp" and drawn with a dotted line. Similar to FIG. 21, it may be observed that the deviations amongst the alternative methods of estimating the reconstructed force values 25 are substantially less than the differences between any set of reconstructed values 25 and the original force values 23 including the influence of coupling to external electric fields.

Determining which force values are influenced by external electric fields: In the first and second methods, an identification 24 is received (step S2) of which force values 23 are influenced, or likely to be influenced, by coupling to external electric fields.

In some implementations of the first and second methods, the step of receiving the identification 24 may be replaced with a step of determining which, if any, of the force values 23 are influenced, or likely to be influenced, by coupling to external electric fields. This functionality may be implemented in the first circuit 14, the controller 15, the post-processing module 16, or spread amongst all three. As previously noted, these components may all be implemented using a single device in the form of a microcontroller, processor, and so forth, or the relevant functionality may be spread between two or more connected components.

Determining which, if any, of the force values 23 are influenced, or likely to be influenced, by coupling to external electric fields, may be implemented in a number of different ways:

For example, determining which, if any, of the force values 23 are influenced by coupling to external electric fields may include, for each force value 23 flagging the force value 23 as influenced by coupling to external electric fields if the force value 23 exceeds a pre-determined value threshold. Referring again to FIGS. 13 to 16, it may be observed that the original force values 23 which were identified as excluded force values 23b were significantly larger than the adjacent valid force values 23a. Using pre-calibration with known forces, the range of signals expected to correspond to realistic user interactions may be determined, and the pre-determined value threshold may correspond to values exceeding a maximum calibrated input force (or multiple thereof).

Additionally or alternatively, determining Which, if any, of the force values 23 are influenced by coupling to external electric fields may include calculating one or more spatial gradients $$\frac{\partial F}{\partial x}, \frac{\partial F}{\partial y}$$

corresponding to each force value 23 based on the plurality of force values 23, $F(x_m)$, $F(y_n)$ and the respective physical locations $x_m$, $y_n$. Any suitable numerical gradient may be used, including forward, backward and symmetric differences such as:

$$\frac{\partial F}{\partial x} \approx \frac{F(x_{m+1}) - F(x_{m-1})}{x_{m+1} - x_{m-1}} \quad (14)$$

and similar approximate gradients in the y-direction. Note that at the stage of determining spatial gradients, none of the force values 23 have been excluded yet, and so discontinuities due to omitted values are not problematic. Where symmetric difference gradients are calculated, these will need to be. substituted with forward- or backward-difference gradients near edges of the touch panel 1.

For each force value 23, $F(x_m)$, $F(y_n)$, if the corresponding spatial gradient(s)

$$\frac{\partial F}{dx}, \frac{\partial F}{dy}$$

exceed a pre-determined spatial gradient threshold, that force value 23, $F(x_m)$, $F(y_n)$ may be flagged as influenced by coupling to external electric fields. Similar to the value threshold, the spatial gradient threshold may be pre-calibrated to correspond to, or exceed, a maximum spatial gradient measured using known calibration loads. In this way, spatial gradients which exceed the spatial gradient threshold may be interpreted as corresponding to unphysical local curvatures, which consequently are probably due to external interference with the measured force values 23.

Additionally or alternatively, determining which, if any, of the force values 23 are influenced by coupling to external electric fields may include calculating a temporal gradient $$\frac{\partial F}{\partial t}$$

corresponding to each force value 23, based on a currently measured force value $F(t)$ and a buffer storing previously measured force values $F(t-\delta t)$, $F(t-2\delta t)$ and so forth, with $\delta t$ being the sampling interval. For each force value, if the corresponding temporal gradient $$\frac{\partial F}{\partial t}$$

exceeds a pre-determined temporal gradient threshold, that force value 23, $F(t)$ may be indicated as influenced by coupling to external electric fields. Similar to the value threshold and the spatial gradient threshold, the temporal gradient threshold ma be pre-calibrated to correspond to, or exceed, a maximum temporal gradient measured using known calibration loading rates. In this way, temporal gradients which exceed the temporal gradient threshold may be interpreted as corresponding to unphysically rapid loading rates, which consequently are probably due to external interference with the measured force values 23.

The strain induced in the layer of piezoelectric material 7 at the point of a user interaction may depend on the location on the touch panel 1 as well as the applied force. Similarly, values and spatial or temporal gradients may depend on the location or a user interaction as well as the applied force. In general, any or all of the value threshold, the spatial gradient threshold and/or the temporal gradient threshold may be functions of the location of a corresponding user interaction. In implementations in which the first circuit 14 also determines capacitance signals 20, location data 27 corresponding to user interactions may be conveniently determined using the capacitance signals 20. Using the capacitance signals 20 to determine user interaction location data 27 may have the additional advantage of being independent of the force values 23.

Determination of coupling to external electric fields using the common electrode: In implementations which omit the second circuit 17, the common electrode 6 is connected to a system ground or common mode voltage.

However, when the second circuit 17 is connected to the one or more common electrodes 6, the second piezoelectric pressure signal 22 may be combined with the first piezoelectric pressure signals 19 to generate an external interference detection signal 26 which may be correlated with the extent of coupling to external electric fields. The external interference detection signal 26 may form part of the identification 24 of which, if any, of the force values are influenced by coupling to external electric fields.

Figure 23:
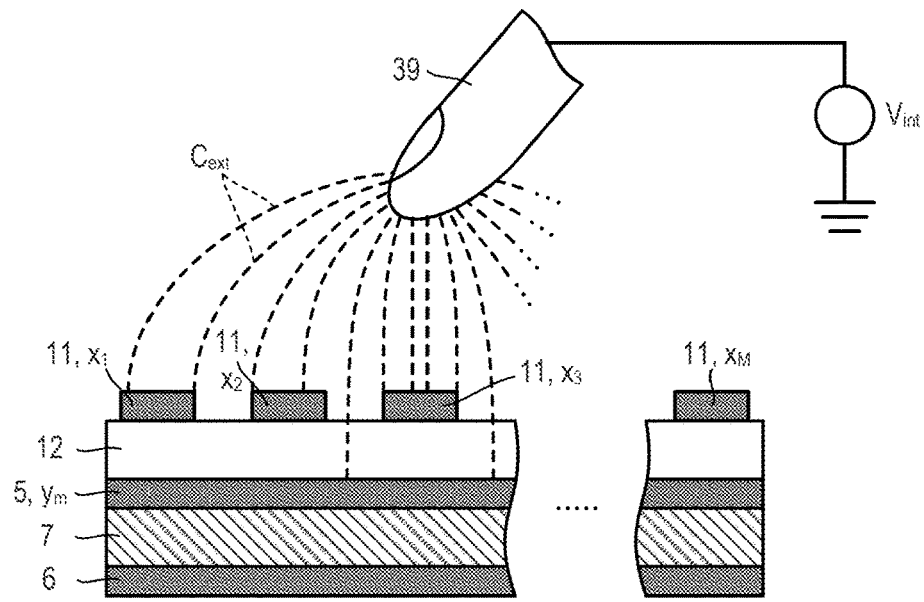
FIG. 23 illustrates a simplified representation of interference coupling between an object and the electrodes of a touch panel.

Referring also to FIG. 23, a simplified representation of coupling between an object 39 and the electrodes 5, 6, 11 of a touch panel 1 is shown.

Figure 24:
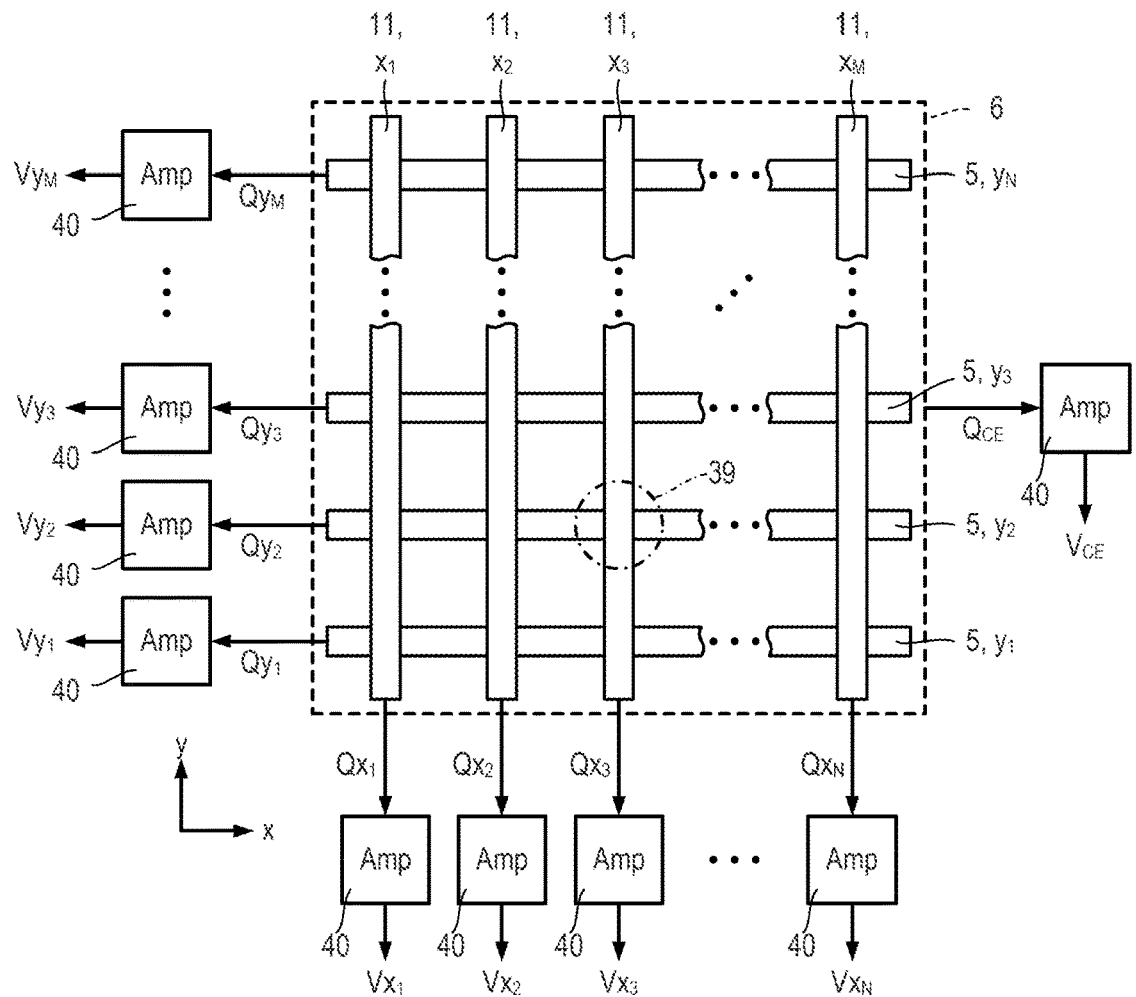
FIG. 24 is a simplified schematic which illustrates the conversion into voltage signals of charges induced on sensing electrodes and common electrode(s) of a touch panel.

Referring also to FIG. 24, a simplified schematic is shown to illustrate the conversion of charges induced on the sensing electrodes 5, 11 and common electrode(s) 6 into voltage signals.

An object 39, for example a user's digit, which is proximate to or touching the touch panel 1 may become charged to a potential $V_{int}$ by electrostatic charging, or from acting as an antenna for a source $V_{int}$ of electromagnetic interference. There is a capacitive coupling $C_{ext}$ between the object 39 and the overall assemblage of all of the sensing electrodes 5, 11 and the common electrode 6. A total electrostatic charge $Q_{PS}$ is induced in the overall assemblage of all of the sensing electrodes 5, 11 and the common electrode 6 as approximately $Q_{ES} = C_{ext} \cdot V_{int}$. It should be noted that it may not be possible to calibrate $C_{est}$ in practice, because the precise geometry will be continually changing as a user moves their digit and/or stylus in relation to the touch panel 1, and also will vary between different users and different digits of the same user. Additionally, $V_{int}$ may not be measureable in general. However, determination or estimation of $C_{ext}$ and/or $V_{int}$ is not necessary in order to determine the external interference detection signal 26.

The following is based on the premise that an unknown, total electrostatic charge $Q_{ES}$ induced on the electrodes 5, 6, 11 will be made up of a sum of individual electrostatic charges induced on each of the electrodes 5, 6 11.

Referring to the $n^{th}$ of N first sensing electrodes 5 by the corresponding physical position $y_n$ and the $m^{th}$ of M second sensing electrodes 11 by the corresponding physical position $x_m$, the electrostatic charge induced on the $m^{th}$ of M second sensing electrodes 11, $x_m$ by the object 39 may be denoted $Sx_m$, and so forth. Similarly the electrostatic charge induced on the $n^{th}$ of N first sensing electrodes 5, $y_n$ by the object 39 may be denoted $Sy_n$ and so forth, and the electrostatic charge induced on the counter electrode 6 by the object 39 may be denoted $S_{CE}$. The total electrostatic charge $Q_{ES}$ may be approximated as:

$$Q_{ES} = \Sigma_{m=1}^{M} Sx_m + \Sigma_{n=1}^{N} Sy_n + S_{CE} \quad (15)$$

When polarisation P of the piezoelectric material layer 7 is induced between the common electrode 5 and the sensing electrodes $x_m$, $y_n$, the charges induced on the sensing electrodes $x_m$, $y_n$ have opposite polarity to the charges induced on the common electrode 6. In other words, external coupling to the object 39 induces charge flow between system ground or common mode voltage and the overall assemblage of all of the electrodes $x_m$, $y_n$, 6, whereas by contrast a polarisation P of the piezoelectric material layer 7 induces charges to flow between the counter electrode 6 and the sensing electrodes $x_m$, $y_n$.

One consequence of this is that charges induced by the polarisation P of the piezoelectric material layer 7 are expected to sum to zero, at least to within a measurement error. For example, if the piezoelectric charge induced on the $m^{th}$ of M second sensing electrodes $x_m$ by a polarisation P of the piezoelectric material layer 7 is denoted $Fx_m$ and so forth, the piezoelectric charge induced on the $n^{th}$ of N first sensing electrodes $y_n$ by a polarisation P of the piezoelectric material layer 7 is denoted $Fy_n$ and so forth, and the piezoelectric charge induced on the counter electrode 6 by a polarisation P of the piezoelectric material layer 7 is denoted $F_{CE}$, then a total induced piezoelectric charge $Q_{PT}$ may be approximated as:

$$Q_{PT}=0=\Sigma_{m=1}^{M}Fx_m+\Sigma_{m=1}^{N}Fy_n+F_{CE} \tag{16}$$

It may also he noted that the piezoelectric charge $F_{CE}$ induced on the counter electrode 6 may provide a good measure of the total force applied to the touch panel 1.

Referring in particular to FIG. 24, the total charge induced on the $m^{th}$ of M second sensing electrodes $x_m$, 11 may be written as:

$$Qx_m=Sx_m+Fx_m \tag{17}$$

Similarly, the charge induced on the $n^{th}$ of N first sensing electrodes $y_n$, 5 may be written as:

$$Qy_n=Sy_n+Fy_n \tag{18}$$

and the charge induced on the counter electrode 6 may be written as:

$$Q_{CE}=S_{CE}+F_{CE} \tag{19}$$

In order to generate the external interference signal 26, the charges $Qx_m$, $Qy_n$ measured on all of the sensing electrodes $x_m$, $y_n$ are summed with the charge $S_{CE}$ measured on the common electrode 6 to yield:

$$Q_{ext} = \sum_{m=1}^{M} Qx_m + \sum_{n=1}^{N} Qy_n + Q_{CE} \tag{20}$$

$$Q_{ext} = \sum_{m=1}^{M} (Sx_m + Fx_m) + \sum_{n=1}^{N} (Sy_n + Fy_n) + (S_{CE} + F_{CE})$$

$$Q_{ext} = \left(\sum_{m=1}^{M} Sx_m + \sum_{n=1}^{N} Sy_n + S_{CE}\right) + \left(\sum_{m=1}^{M} Fx_m + \sum_{n=1}^{N} Fy_n + F_{CE}\right)$$

In which $Q_{ext}$ is the sum of all the charges measured by the common electrode 5 and all of the sensing electrodes $x_m$, $y_n$. The external interference signal may correspond to or be related to the sum $Q_{ext}$. Referring to Equations (15) and (16), under ideal conditions the first bracketed term of Equation (20) is equal to the total electrostatic charge $Q_{ES}$ and the second bracketed term of Equation (20) is equal to zero. Under practial, non-ideal conditions, the external interference signal may still he approximated to the total electrostatic charge $Q_{ES}$:

$$\Sigma_{m=1}^{M}Qx_m+\Sigma_{m=1}^{N}Qy_n+Q_{CE}=Q_{ext}\approx Q_{ES} \tag{21}$$

In practice, the charges $Qx_m$, $Qy_n$, $Q_{CE}$ may be detected using charge amplifiers 40, for example incorporated into the first and second circuits 14, 15. A voltage output corresponding to the $m^{th}$ of M second sensing electrodes $x_m$, 11 may be denoted $Vx_m$, and is related to $Qx_m$, and so forth. Although FIG. 24 illustrates a single charge amplifier 40 connected to each electrode 5, 6, 11, this need not he the case. For example, two or more adjacent first sensing electrodes 5 may be connected to a single charge amplifier 40, and similarly for the second sensing electrodes 11. Furthermore, each electrode 5, 6 11 may be connected to additional processing circuitry (not shown) in addition to being connected to a charge amplifier 40.

Commonly, a charge amplifier 40 will integrate the input current For example, if the current on the $m^{th}$ of M second sensing electrodes $x_m$ is $Ix_m$, then the voltage $Vx_m$ on the $m^{th}$ of M second sensing electrodes $x_m$ at a time t may, under ideal conditions, be expressed as:

$$Vx_m=Gx_mQx_m=Gx_m\int_0^t Ix_m(\tau)d\tau \tag{22}$$

In which $Gx_m$ is the gain of the $m^{th}$ of M charge amplifiers 40 connected to the M second sensing electrodes $x_m$ and $\tau$ is an integration variable. Similarly, the voltage $Vy_n$ on the $n^{th}$ of N first sensing electrodes $y_n$ may be expressed as:

$$Vy_n=Gy_nQy_n=Gy_n\int_0^t Iy_n(T)d\tau \tag{23}$$

In which $Gy_n$ is the gain of the $n^{th}$ of N charge amplifiers 40 connected to the N first sensing electrodes $y_n$, $Iy_n$ is the current on the $n^{th}$ of N first sensing electrodes $y_n$ and $\tau$ is an integration variable. Similarly, the voltage $V_{CE}$ on the common electrode 6 may be expressed as:

$$V_{CE}=G_{CE}Q_{CE}=G_{CE}\int_0^t I_{CE}(\tau)d\tau \tag{24}$$

In which $G_{CE}$ is the gain of the charge amplifier 40 connected to the common electrode 6, $I_{CE}$ is the current on the common electrode 6 and $\tau$ is an integration variable. The external interference signal, denoted in this instance as $V_{ext}$, ay be then approximated as the sum of all the charge amplifier 40 signals:

$$V_{ext} = \sum_{m=1}^{M} Vx_m + \sum_{n=1}^{N} Vy_n + V_{CE} \tag{25}$$

$$V_{ext} = \sum_{m=1}^{M} Gx_m Qx_m + \sum_{n=1}^{N} Gy_n Qy_n + G_{CE}Q_{CE}$$

If the gains are all substantially equal such that $Gx_m \approx Gy_n \approx G_{CE} \approx G$ then, the external interference signal 6 in terms of voltage $V_{ext}$, may be expressed as a simple multiple of the external interference signal 26 in terms of charge $Q_{ext}$, i.e. $V_{est} \approx G.Q_{ext}$. However, in practice, the charge amplifier 40 gains $Gx_m$, $Gy_n$, $G_{CE}$ will not be precisely identical. Furthermore, each charge amplifier 40 will in practice experience DC offsets and drift, in addition to time-dependent decay of low frequency and DC components in the voltage output (sometimes referred to as "roll-off").

Therefore, in practical terms, the external interference signal 26, $V_{ext}$ may be viewed as corresponding to a measurement of the charge $Q_{ES}$ induced by an interfering source $V_{int}$, plus a noise term:

$$V_{ext}=\Sigma_{m=1}^{M}Vx_m+\Sigma_{m=1}^{N}Vy_n+V_{CE}=G_T Q_{ES}+\varepsilon \tag{26}$$

In which $G_v$ is a constant relating to the overall gain of the charge amplifiers 40 and $\varepsilon$ is a term representing the instantaneous error or noise resulting from the various sources described hereinbefore. The noise term ε is thought to be primarily composed of residual components of the pressure signals 19, 22 which have not been cancelled out due to slight imbalances in the individual charge amplifier 40 gains $Gx_m$, $Gy_n$, $C_{CE}$. Although a value of the constant $G_T$ might be calibrated, this is unnecessary. All that is needed is to determine a suitable threshold value, $V_{thresh}$, above which it may be reliably determined that the external interference signal 26, is detecting the influence of an interfering source $V_{int}$.

For example, the touch panel 1 may be placed in a shielded container and a range of input forces applied using a non-conductive stylus or comparable object 39. Under such circumstances, the total externally induced charge $Q_{ES}$ should be approximately zero, such that Equation (26) may be simplified to:

$$V_{ext} \approx \varepsilon \qquad (27)$$

After recording a suitable length of signal, spanning a suitable range of applied forces, for example between 0.5 N and to N, a suitable threshold $V_{thresh}$ may be determined based on the measured values of ε. The threshold $V_{thresh}$ may be set as a multiple of the maximum absolute value of ε recorded. For example, $V_{thresh}=1.5 \times \max(|\varepsilon|)$ or $V_{thresh}=2 \times \max(|\varepsilon|)$ and so forth.

Alternatively, a standard error may be calculated based on the measured values of ε, and the threshold voltage $V_{thresh}$ may be set as a multiple of the standard error $\sigma_\varepsilon$. For example, $V_{thresh}=3 \times \sigma_\varepsilon$ or $V_{thresh}=5 \times \sigma_\varepsilon$.

Subsequently, determining which, if any, of the force values 23 are influenced by coupling to external electric fields may include the controller 15 or post-processing module 16 obtaining the external interference signal $V_{ext}$ and comparing it against the pre-calibrated threshold value $V_{thresh}$. If the amplitude of the external interference signal $V_{ext}$ is less than the threshold $V_{thresh}$, i.e. $|V_{ext}|<V_{thresh}$, then i.e. then the piezoelectric pressure signals 19, 22 and corresponding force values 23 are unlikely to be significantly influenced by an external interference source $V_{int}$.

However, if the amplitude of the external interference signal $V_{ext}$ is greater than or equal to the threshold $V_{thresh}$, i.e. $|V_{ext}| \geq V_{thresh}$, then the piezoelectric pressure signals 19, 22 and corresponding force values 23 are probably being influenced by an external interference source $V_{int}$. In this case, the indication 24 may include an interference flag $Int_{flag}$ set to a suitable value such as, for example, 'true', unity, and so forth.

The interference flag $Int_{flag}$ may be used in a number of different ways to determine or contribute to determining which, if any, force values 23 should be flagged as excluded force values 23b.

In one example, the interference $Int_{flag}$ may be used in conjunction with location data 27 corresponding to one or more user interactions to simply designate all force values 23 which correspond to physical locations $x_m$, $y_n$ within a pre-determined distance from a user interaction location as excluded force values 23b. The location data 27 for user interactions may be determined using the first pressure signals 19. However, it may be advantageous to determine the location data 27 for user interactions independently of the pressure signals 19, 22 by using capacitance signals 20 (if these are available). This approach can be effective because the coupling to a user's digit or similar object 39 is typically more localised than the deformation of the layer of piezoelectric material 7.

In another example, the interference flag $Int_{flag}$ may be used in conjunction with one or more of the value threshold, the spatial gradient threshold and/or the temporal gradient threshold. For example, force values 23 may be compared against a first value threshold when the interference flag $Int_{flag}$ is unset, and compared against a second, lower, value threshold when the interference flag $Int_{flag}$ is set. In this way, a lower value threshold may be applied when the external interference signal $V_{ext}$ indicates a high probability of unwanted coupling to external electric fields. Similar dual thresholds may also be used for the spatial and/or temporal gradient thresholds.

Designation of a particular force value 23 as an excluded force value 23b may be dependent on exceeding multiple thresholds as the same time. For example, a force value 23 may be excluded if two out of die value threshold, the spatial gradient threshold and the temporal gradient threshold are exceeded at the same time. In another example, a force value 23 may be excluded if any one of the value threshold, the spatial gradient threshold and the temporal gradient threshold is exceeded at the same time that the interference flag $Int_{flag}$ is set to a value of true, unity and so forth.

Modifications

It will be appreciated that many modifications may be made to the embodiments hereinbefore described. Such modifications may involve equivalent and other features which are already known in the design, manufacture and use of piezoelectric pressure sensing touch panels, capacitive touch panels or combined piezoelectric pressure and capacitive touch panels, and which may be used instead of or in addition to features already described herein. Features of one embodiment may be replaced or supplemented by features of another embodiment.

In the preceding examples, the interpolation of estimated force values $F_{est}(x'_m)$, $F_{est}(y'_n)$ has been described as being independent in x- and y-directions. However, in some implementations, two-dimensional interpolation may be used to determine estimated force values $F_{est}(x'_m, y'_n)$ using an interpolation surface. For example, by applying the two-dimensional form of Lagrange interpolation.

Unconditional Interpolation

Examples have been described hereinbefore in which the exclusion of one or more force values 23, F(xm), F(yn) as excluded force values 23b is conditional upon receiving and/or determining that those force values 23, F(xm), F(yn) are, or are likely to be, influenced by coupling to external electric fields.

However, since the coupling of noise into the system via a user's digit or stylus is typically more localised than the deflection of the touch panel 1, an alternative approach is to simply set all force values 23, F(xm), F(yn) corresponding to physical locations within a predetermined or dynamically determined threshold distance dexc of at least one location corresponding to a user touch (alternatively a "user touch location") to be as excluded force values 23b. The force values 23, F(xm), F(yn) corresponding to physical locations outside the threshold distance dexc of any user touch locations are set as valid force values 23a. Reconstructed force values 25 may then be calculated according to any of the methods described hereinbefore.

User touch locations may be determined from, for example, the touch location data 27. Touch location data 27 may be determined based on the first pressure signals 19, and optionally the second pressure signals 22, as described hereinbefore. Additionally or alternatively, the touch location data 27 may be determined based on capacitance signals 20, when available. The touch location data 27 may be determined based on a combination of the first pressure signals 19 and the capacitance signals 20.

The value of the threshold distance dexo used will depend on the specific touch panel 1 used, amongst other factors. The precise threshold distance dexc to use may be predetermined, based on similar calibration experiments to those described hereinbefore. Alternatively, the value of the threshold distance dexc used to determine which force values 23, F(xm), F(yn) to exclude may be dynamically determined in use. In some examples, the controller 15, the post-processing module 16 and/or an operating system of a device incorporating the touch panel 1 may vary the value of the threshold distance dexc based on the current operating environment. For instance, in examples for which the external interference signal Vext determined, the threshold distance dexc may be increased in response to an increase in the external interference signal Vext indicating increased levels of external noise, and vice-versa.

Suitable values for the threshold distances dexc may span a range between one and several times a typical diameter of the contact area of a user's digit or stylus. For example, the threshold distance dexc may vary between 5 mm and 40 mm, inclusive of the end-points. When capacitive measurements are included, these may be used to estimate the contact area of a user's digit or stylus in order to adapt the threshold distance $d_{exc}$ to the size of a user's digit or stylus.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention, The applicant hereby gives notice that new claims may be formulated to such features andlor combinations of such features during the prosecution of the present application or of any further application derived therefrom.

What is claimed is:

1. A method comprising:
   receiving, from a touch panel, force values corresponding to a plurality of piezoelectric sensors, each piezoelectric sensor corresponding to a physical location on the touch panel;
   receiving one or more user touch locations corresponding to user touches;
   excluding all force values corresponding to physical locations within a distance of a user touch location, and setting the remaining force values as valid force values; and
   interpolating and/or extrapolating, based on the valid force values, one or more reconstructed force values corresponding to the same physical locations as the respective excluded force values.

2. The method according to claim 1, wherein receiving the one or more user touch locations comprises:
   receiving, from the touch panel, capacitive touch information; and
   determining the one or more user touch locations based on the capacitive touch information.

3. The method according to claim 1, wherein receiving the one or more locations corresponding to user touches comprises determining the one or more user touch locations based on pressure signals received from the plurality of piezoelectric sensors.

4. The method according to claim 1, wherein the plurality of piezoelectric sensors comprise a layer of piezoelectric material disposed between a plurality of sensing electrodes and at least one common electrode, each piezoelectric sensor formed of a sensing electrode and a common electrode;
   the method further comprising receiving an external interference signal which is a sum over signals received from all of the sensing electrodes and the, or each, common electrode;
   in response to the external interference signal exceeds a pre-determined external interference threshold, setting a global flag; and
   in response to the global flag being set, excluding all force values corresponding to physical locations with a pre-determined distance of a user touch location.

5. The method according to claim 1, wherein the distance is a predetermined distance.

6. The method according to claim 1, wherein the distance is a dynamically determined distance.

7. The method according to claim 1, wherein interpolating and/or extrapolating one or more reconstructed force values comprises performing polynomial interpolation based on the valid force values and the respective physical locations.

8. The method according to claim 7, wherein interpolating and/or extrapolating one or more reconstructed force values comprises:
   determining a set of interpolation locations, the number of interpolation locations being equal to the number of force values received, wherein the interpolation locations have a higher spatial density towards the edges of the touch panel than the physical locations;
   determining an estimated force value for some or all of the interpolation locations by interpolating or extrapolating the valid force values from two or more physical locations proximate to or spanning the interpolation location;
   performing polynomial interpolation using the estimated force values and the corresponding interpolation locations; and
   determining the one or more reconstructed force values using the polymer interpolant.

9. The method according to claim 8, wherein determining an estimated force value for some or all of the interpolation locations comprises determining an estimated force value for every interpolation location.

10. The method according to claim 8, wherein determining an estimated force value for some or all of the interpolation locations comprises:
    determining an estimated force value for each interpolation location which is spanned by a pair of adjacent physical locations which both correspond to valid force values; and
    determining an estimated force value for each interpolation location which is within a predetermined distance of a physical location corresponding to a valid force value.

11. The method according claim 8, wherein determining an estimated force value for some or all of the interpolation locations comprises:
    determining an estimated force value for each interpolation location which corresponds to a valid force value.

12. The method according to claim 1, wherein the plurality of piezoelectric sensors comprise a layer of piezoelectric material disposed between a plurality of sensing electrodes and at least one common electrode, each piezoelectric sensor formed of a sensing electrode and a common electrode, and wherein the method further compriseswherein:

in response to a user touch location is at or less than a predetermined distance from an edge of the touch panel, receiving an external interference signal which is a sum over signals received from all of the sensing electrodes and the, or each, common electrode;

in response to the external interference signal exceeding a pre-determined external interference threshold, setting a global flag; and in response to the global flag being set, excluding all force values corresponding to physical locations within a predetermined distance of a user touch location.

13. The method according to claim 8, wherein each estimated force value is determined by:
   a) performing a linear interpolation based on a first physical location which corresponds to a valid force value, and a second physical location which is the closest physical location preceding the first physical location and corresponding to a valid force value; or
   b) performing a linear interpolation based on the first physical location and a third physical location which is the closest physical location following the first physical location and corresponding to a valid force value;
   wherein the first physical location is the physical location of a valid force value which corresponds to, or is closest to, the interpolation location;
   wherein the selection of steps a) or b) is made in dependence upon comparing a cost function calculated for the first and second physical locations with a cost function calculated for the first and third physical locations.

14. The method according to claim 8, wherein a first physical location is a physical location of a valid force value which corresponds to, or is closest to, an interpolation location, and wherein each estimated force value is determined by:
   a) performing a linear interpolation based on a first pair of physical locations which are closest to the first physical location in any direction; or
   b) performing a linear interpolation based on a second pair of physical locations corresponding to the physical location which corresponds to a valid pressure value immediately preceding the first physical location, and the physical location which corresponds to a valid pressure value immediately following the first physical location;
   wherein the selection of steps a) or b) is made in dependence upon comparing a cost function calculated for the first pair of physical locations with a cost function calculated for the second pair of physical locations.

15. The method according to claim 1, wherein interpolating and/or extrapolating one or more reconstructed force values comprises fitting a force value model to the valid force values and the respective physical locations.

16. The method according to claim 1, wherein interpolating and/or extrapolating one or more reconstructed force values comprises determining a spline interpolant passing through each of the valid force values and the respective physical locations.

17. A computer program stored on a non-transitory computer readable medium and comprising instructions for causing a data processing apparatus to execute a method according to claim 1.

18. An apparatus configured:
   to receive force values corresponding to a plurality of piezoelectric sensors, each piezoelectric sensor corresponding to a physical location on a touch panel;
   to receive one or more user touch locations corresponding to user touches;
   to exclude all force values corresponding to physical locations within a distance of a user touch location, and to set the remaining force values as valid force values; and
   to interpolate and/or extrapolate, based on the valid force values, one or more reconstructed force values corresponding to the same physical locations as the respective excluded force values.

19. The apparatus of claim 18 further comprising:
   a touch panel comprising a plurality of piezoelectric sensors.

* * * * *